(12) United States Patent
Towle et al.

(10) Patent No.: US 10,100,144 B2
(45) Date of Patent: Oct. 16, 2018

(54) METHOD FOR MAKING PARTICULATE AMINE-FUNCTIONALIZED POLYARYLETHERKETONE POLYMERS AND COPOLYMERS THEREOF

(71) Applicant: KETONEX LIMITED, Oxford (GB)

(72) Inventors: Ian David Henderson Towle, Oxfordshire (GB); Kaylie Jane Smith, Oxfordshire (GB)

(73) Assignee: Ketonex Limited, Oxford (GB)

( * ) Notice: Subject to any disclaimer, the term of this patent is extended or adjusted under 35 U.S.C. 154(b) by 0 days.

(21) Appl. No.: 15/312,395

(22) PCT Filed: May 21, 2015

(86) PCT No.: PCT/GB2015/051487
§ 371 (c)(1),
(2) Date: Nov. 18, 2016

(87) PCT Pub. No.: WO2015/177549
PCT Pub. Date: Nov. 26, 2015

(65) Prior Publication Data
US 2017/0107323 A1    Apr. 20, 2017

(30) Foreign Application Priority Data

May 22, 2014    (GB) .................................. 1409126.8

(51) Int. Cl.
*C08G 61/12*    (2006.01)
*C08G 65/40*    (2006.01)
*C08G 75/23*    (2006.01)

(52) U.S. Cl.
CPC ...... *C08G 61/127* (2013.01); *C08G 2261/122* (2013.01); *C08G 2261/126* (2013.01); *C08G 2261/1644* (2013.01); *C08G 2261/3442* (2013.01); *C08G 2261/3444* (2013.01); *C08G 2261/45* (2013.01)

(58) Field of Classification Search
CPC ...................................................... C08G 61/12
USPC .......................................................... 528/220
See application file for complete search history.

(56) References Cited

FOREIGN PATENT DOCUMENTS

| CN | 102 875 819 A | 1/2013 |
|---|---|---|
| EP | 0254585 A2 | 1/1988 |
| WO | WO 02/00270 A1 | 1/2002 |
| WO | WO 2011/004164 A2 | 1/2011 |
| WO | WO 2014/095794 A2 | 6/2014 |

OTHER PUBLICATIONS

International Search Report mailed by European Patent Office dated Jul. 28, 2015 in the corresponding PCT Application No. PCT/GB2015/051487—4 pages.
(Continued)

*Primary Examiner* — Duc Truong
(74) *Attorney, Agent, or Firm* — Knobbe, Martens, Olson & Bear, LLP

(57) ABSTRACT

The present invention provides a method of preparing an amine-functionalized (e.g. amine-terminated) polyaryletherketone polymer, or imide- or sulphone-copolymer thereof and amine-protected analogs thereof, said method comprising the step of polymerizing a monomer system in a reaction medium comprising a capping agent comprising —NR$_2$, —NRH or a protected amine group.

21 Claims, 3 Drawing Sheets

Reactive end cap PEKK polymer particles with different T:I ratios

(56) References Cited

OTHER PUBLICATIONS

Written Opinion issued by European Patent Office in the corresponding PCT Application No. PCT/GB2015/051487—5 pages.
Search Report under Section 17 issued by Intellectual Property Office in UK on Nov. 24, 2014—1 page.
G.C. Corfield, et al., "Synthesis and Calorimetric Curing Study of Amino-Terminated PEEK Oligomers," Journal of Polymer Science, Polymer Chemistry Edition, vol. 30, No. 5, Apr. 1992, pp. 845-849.
O. Noiset, et al., "Surface Modification of Poly(aryl ether ether ketone)(PEEK) film by Covalent Coupling of Amines and Amino Acids through a Spacer Arm," Journal of Polymer Science, Polymer Chemistry Edition, Interscience Publishers, vol. 35, No. 17, Dec. 1, 1997, pp. 3779-3790.
Database WPI Week 201343 Thomson Scientific, London, GB; AN 2013-G00858, XP002742495.

Reactive end cap PEKK polymer particles with different T:I ratios

Copolymer backbone PEKK imide and cross-linked versions at different magnifications showing size, shape, and surface feature SEM at 500X magnification of amine reactive end cap PEKK polymer particle with T:I ratio of 80

SEM scan at 2000X magnification of amine reactive end cap PEKK polymer particle with T:I ratio of 80/20 showing surface features of the particle Infra-Red spectrum of polymer of Example 1, showing -$NH_2$ groups.

METHOD FOR MAKING PARTICULATE AMINE-FUNCTIONALIZED POLYARYLETHERKETONE POLYMERS AND COPOLYMERS THEREOF

FIELD OF THE INVENTION

The present disclosure concerns functionalised (e.g. amine-functionalised) polyarylether ketones (PAEKs or PEKs). In particular, it concerns methods for making the reactive PAEKs, for example using an electrophilic process in which the reactive end-cap is protected during the reaction and subsequently de-protected during the final work-up.

BACKGROUND OF THE INVENTION

Common terminology involves naming such polymers by reference to the structure of the repeating unit (as is standard in polymer chemistry) with families being named according to the sequence of ether (symbolised by "E") and ketone (symbolised by "K") linkages in the repeat units. For example, polymers consisting essentially of the repeating unit: —Ar—O—Ar—C(=O)—Ar—C(=O)— would be referred to as "PEKK".

Polyarylether ketones (or "PEKs) have a variety of useful properties, such as excellent electrical insulating and mechanical properties at high temperature, high strength, toughness and resistance to heat and chemicals. Such polymers may be amorphous or semi-crystalline. Both types usually exhibit high glass transition temperatures ($T_g$), while the semi-crystalline forms also exhibit high melting temperatures ($T_m$). Amongst these polymers, the PEK, PEKK, PEEK, PEEKK and PEKEKK families are of particular interest for use in preparing biomedical implants and implant materials due to their excellent mechanical properties, chemical inertness and resistance to stress cracking. The same materials are also useful in aerospace and many other wide-ranging industrial applications including the preparation of thermoplastic composites.

The production of amino-terminated PEEK is described in Corfield et al. ("Synthesis and Colorimetric curing study of Amino-terminated PEEK oligomers" *J. Polymer Sci.* (1992) 30:845-849). This polymer is produced via a nucleophilic process in which a meta-aminophenol end-capper is used to terminate the linear polymer chains. The purpose of producing this polymer was to study the behaviour of the system on curing. Specifically, it was found that thermal cross-linking produced a highly cross-linked and amorphous solid. There is no suggestion in Corfield that there would be any particular benefits to using amino-terminated PEEK or that the process could be extended to other PAEKs.

An improved process for the production of PEKK is described in WO 2011/004164 (Ketonex). This process is electrophilic (i.e. a Friedel-Crafts process) and uses a Lewis acid and a controlling agent such as benzoic acid. This dispersion process can yield particles of a PEKK product having a uniform shape and a controllable size distribution. WO '164 is silent as to the use of capping agents other than those having phenyl or chlorophenyl end-groups and provides no teaching towards incorporating functionalised end-caps into PEKK.

As noted above, PAEKs have wide-ranging uses due to their excellent mechanical properties, chemical inertness and resistance to stress cracking. However, some applications of the polymers would benefit from further functionality. There thus exists a need for functionalised PAEKs and methods for their preparation.

The present inventors have surprisingly found that amine-functionalised (e.g. amine-terminated) PAEKs can be produced using a process in which the reactive amine end-cap is protected during the reaction and subsequently de-protected during the final work-up. The invention thus conveniently enables the addition of amine groups when performing the polymerisation reaction, i.e., no additional steps are required on order to achieve amine functionalisation. The use of protecting groups is common in pharmaceutical organic chemistry, but is generally avoided in polymer chemistry and other industrial applications due to the additional cost and complexity it can add to a process.

SUMMARY OF THE INVENTION

Thus, viewed from a first aspect, the present disclosure provides amine-functionalised (e.g. amine-terminated) polyarylether ketone polymers, or imide- or sulphone copolymers thereof and amine protected analogues thereof in particulate form, i.e. particles of an amine-functionalised (e.g. amine-terminated) polyarylether ketone polymer, or imide- or sulphone copolymer thereof and amine protected analogues thereof.

DETAILED DESCRIPTION OF THE INVENTION

Preferably, the particulate polymers of the present disclosure are particles of an amine-functionalised polyarylether ketone polymer or copolymer thereof, said polymer or copolymer having an inherent viscosity (IV) of at least 0.28 dl/g, particularly in the range of 0.4-1.7 dl/g, and in some embodiments, the IV is in the range of 0.6-1.5 dl/g,
  wherein said amine-functionalised polyarylether ketone polymer or copolymer thereof is selected from the group consisting of: polyarylether ketone polymer with terminal amine or protected amine functional group(s); polyarylether ketone-imide copolymer with terminal amine or protected amine functional group(s); and polyarylether ketone-sulphone copolymer with terminal amine or protected amine functional group(s). The particles may be substantially spherical in shape or rod shaped.
  In some embodiments, the particles are substantially spherical in shape with an aspect ratio (R) of about 1 to 1.5 or rod shaped with an aspect ratio 1.5 to 10 (where R=a/b, "a" is the largest dimension, and "b" is the smallest dimension).

Viewed from a further aspect, the particulate polymers of the present disclosure are particles of an amine-functionalised polyarylether ketone polymer or copolymer thereof, said polymer or copolymer having a weight average molecular weight (Mw) of at least 8,000, preferably greater than 10,000, an inherent viscosity of at least 0.28 dl/g, and a glass transition temperature of at least 140° C. as measured by differential scanning calorimetry,
  wherein said amine-functionalised polyarylether ketone polymer or copolymer thereof is selected from the group consisting of: polyarylether ketone polymer with terminal amine or protected amine functional group(s); polyarylether ketone-imide copolymer with terminal amine or protected amine functional group(s); and polyarylether ketone-sulphone copolymer with terminal amine or protected amine functional group(s), and
  wherein said particles are substantially spherical in shape with an aspect ratio (R) of about 1 to 1.5 or rod shaped with an aspect ratio 1.5 to 10 (where R=a/b, "a" is the largest dimension, and "b" is the smallest dimension).

The term "functionalised" is intended to encompass polymers with one or more amine functional groups as endgroups. It also encompasses polymers in which the amine groups are substituents on the polymer chain, i.e. pendant to the backbone. Preferably, the polymers are functionalised at the end groups.

The polymers of the present disclosure can be produced using a process in which the reactive (nucleophilic) end-cap is protected during the reaction and subsequently de-protected during the final work-up.

The present disclosure therefore provides a method of preparing an amine-functionalised (e.g. amine-terminated) polyaryletherketone polymer, or imide- or sulphone-copolymer thereof, said method comprising the step of polymerising a monomer system in a reaction medium comprising a capping agent comprising —NR$_2$, —NRH or a protected amine group. As this conveniently enables the addition of amine groups when performing the polymerisation reaction, the method is preferably a single-step reaction, i.e., no additional steps before or after polymerisation are required in order to achieve amine functionalisation.

Preferably the process involves the use of a Lewis acid. Therefore, viewed from a further aspect, the present disclosure provides a method of preparing an amine-functionalised (e.g. amine-terminated) polyaryletherketone polymer, or imide- or sulphone-copolymer thereof,
said method comprising the step of polymerising a monomer system in a reaction medium comprising:
(a) a Lewis acid; and
(b) a capping agent comprising —NR$_2$, —NRH or a protected amine group.

Particularly preferably, the process further involves a controlling agent. Thus, viewed from one aspect, the present disclosure provides a method of preparing an amine-functionalised (e.g. amine-terminated) polyaryletherketone polymer, or imide- or sulphone-copolymer thereof, said method comprising the step of polymerising a monomer system in a reaction medium comprising:
(a) a Lewis acid;
(b) a controlling agent and
(c) a capping agent comprising —NR$_2$, —NRH or a protected amine group.

"R" is either an aliphatic or aromatic group and is defined below.

Preferably the controlling agent comprises an aromatic carboxylic acid, an aromatic sulphonic acid, or a derivative thereof or a Lewis base.

The functionalised polyaryletherketones of the present disclosure are polymers comprising the unit —Ar—O—Ar—C(=O)—. They are characterised by aryl groups that are linked via ether, carbonyl (ketone), sulphone or imide groups and include, but are not limited to the following (and combinations thereof):

Poly (ether ketone), i.e. PEK, a polymer consisting essentially of the repeat unit: —Ar—O—Ar—C(=O)—.
Poly (ether ketone ketone), i.e. PEKK, a polymer consisting essentially of the repeat unit: —Ar—O—Ar—C(=O)—Ar—C(=O)—.
Poly (ether ether ketone), i.e. PEEK, a polymer consisting essentially of the repeat unit: —Ar—O—Ar—O—Ar—C(=O)—.

Poly (ether ether ketone ketone), i.e. PEEKK, a polymer consisting essentially of the repeat unit: —Ar—O—Ar—O—Ar—C(=O)—Ar—C(=O)—.
Poly (ether ketone ether ketone ketone), i.e. PEKEKK, a polymer consisting essentially of the repeat unit: —Ar—O—Ar—C(=O)—Ar—O—Ar—C(=O)—Ar—C(=O)—.
Poly (ether ketone ketone), i.e. PEKK, is particularly preferred.

Thus, preferably the polyaryletherketone polymers or copolymers of the present disclosure comprise one or more of the following aryletherketone repeat units:
—Ar—O—Ar—C(=O)—
—Ar—O—Ar—C(=O)—Ar—C(=O)—
—Ar—O—Ar—O—Ar—C(=O)—
—Ar—O—Ar—O—Ar—C(=O)—Ar—C(=O)—
—Ar—O—Ar—C(=O)—Ar—O—Ar—C(=O)—Ar—C(=O)—
wherein each Ar is independently an aromatic moiety.

Homopolymers of the above types are preferred, however, copolymers of the above repeat units with each other (e.g. PEKK-PEKEKK-PEKK) and with imide or sulphone units are also encompassed. Copolymers according to the present disclosure include alternating, periodic, statistical, random and block copolymers.

References to polymers comprising a particular unit (e.g. an aryletherketone unit and optionally also an imide unit and/or a sulphone unit) as herein described should be understood to encompass polymers containing one or more of said units or combination of units, as well as polymers consisting of, or consisting essentially of, said units or combination of units.

If desired, the polymers of the present disclosure may be blended with one another or with other types of polymer to form polymer blends.

Each aromatic moiety in the polymer repeating unit (Ar) may be independently selected from substituted and unsubstituted mononuclear aromatic moieties (e.g. phenylene) and substituted and unsubstituted polynuclear aromatic moieties. The term "polynuclear" is considered to encompass fused aromatic rings such as naphthalene and non-fused rings such as biphenyl, etc. Particularly preferably, Ar is phenylene (Ph) e.g. unsubstituted phenylene.

The phenylene and polynuclear aromatic moieties (i.e. "Ar") may contain substituents on the aromatic rings. Such substituents would be readily understood by the skilled person and should not inhibit or otherwise interfere with the polymerisation reaction to any significant extent. Typical substituents may include, for example, phenyl, halogen (e.g. F, Cl, Br, I), ester, nitro, cyano and the like.

In cases where Ar is substituted, the substituents are preferably pendant to the chains, rather than in the backbone, i.e. not bonded to a carbonyl carbon atom of a ketone linkage nor to an oxygen atom of an ether linkage. Thus, in a particularly preferred aspect, the ketone linkages (i.e. the carbon atoms of the carbonyl group) are directly attached to carbon atoms, especially to carbon atoms of adjacent aromatic (i.e. to aromatic carbons). Similarly, the oxygen atoms of the ether linkages are preferably attached to carbon atoms, especially to aromatic carbon atoms of adjacent aromatic groups.

The polymers of the present disclosure are "functionalised" insofar as they comprise one or more amine groups as end groups, i.e. at one or more ends of the polymer chain and/or as pendant groups, i.e. at one or more positions along the polymer backbone. With regard to particulate polymers of the present disclosure, the term "functionalised" is therefore intended to encompass amine groups on the particles, at least some of which have the potential to bond with other materials, e.g. other monomers in formulations.

The functional groups for the polymers of the present disclosure are amines, i.e. —$NR_2$, NRH or —$NH_2$, preferably NRH or —$NH_2$, especially —$NH_2$, and derivatives thereof, where "R" is either an aliphatic or aromatic group. Where R is an aromatic group, it is preferably Ar as herein described (especially phenyl). Where R of —$NR_2$ or NRH is an aliphatic group, it is preferably selected from alkyl groups, e.g. C1-6 aliphatic groups, especially methyl or ethyl groups. The compounds described herein in which the functional group is protected, i.e. those functionalised by protected amine groups as described herein, form a further aspect of the present disclosure.

Multiple amine functionalisation is also encompassed, e.g. where a phenyl ring at the end of the polymer has more than one, i.e. 1 to 5 amine groups thereon.

Preferably, the polymers of the present disclosure are terminated with an amine group, i.e. an amine group is found on at least one end of the polymer chain. Typically at least 50% of the end groups, i.e. the ends of the polymer chains are amine-functionalised, preferably at least 70%, especially preferably at least 85%, e.g. at least 95%. Preferably, substantially all chain ends comprise an amine group. Amine-terminated polymers are particularly preferred.

In a further aspect, as an alternative to, or in addition, to amine-termination of the chain, the amine groups may be pendant to the polymer chain, i.e. they are substituents of the polymer's aromatic moieties. Typically, 0 to 100% of the Ar groups, preferably 25 to 75%, i.e. around 50% of the Ar groups are substituted with an amine group.

The amine groups of the present disclosure may be situated on aryl groups which themselves are attached to ketone and/or ether linkages of the polymer. In a less preferred aspect, there may be a linker group between the aryl group of the polymer chain and the amine group.

Linear polymers are preferred, however cross-linked polymers are also encompassed. Cross-linked polymers may be produced by using cross-linking agents and/or suitable monomers containing more than two (i.e. 3, 4, 5 or 6) ether or carboxylic acid halide (e.g. chloride) groups in the methods of the present disclosure. Examples of such monomers and agents include benzene-1,3,5-tricarbonyl chloride; 1,3,5-triphenoxy benzene; benzene-2,3,5,6-tetracarbonyl chloride; benzene-1,2,3,4,5,6-hexacarbonyl chloride; 1,2,3, 4,5,6-hexaphenoxy benzene; naphthalene-1,4,5,8-tetracarbonyl chloride, triphenoxybenzene, benzenetricarboxylic acid chloride, hexaphenyl benzene and the like. These monomers or agents are typically used in relatively low concentrations, e.g. from 0.5M % to 25M %, or between 0.5M % and 25M %.

Especially preferably the compounds of the present disclosure are linear and terminated with a functional group. Particularly preferred compounds are those according to the following formulae (and imide- or sulphone-copolymers thereof):

E-[-Ar—O—Ar—C(=O)-]$_n$-E
E-[-Ar—O—Ar—C(=O)—Ar—C(=O)-]$_n$-E
E-[-Ar—O—Ar—O—Ar—C(=O)-]$_n$-E
E-[-Ar—O—Ar—O—Ar—C(=O)—Ar—C(=O)-]$_n$-E
E-[—Ar—O—Ar—C(=O)—Ar—O—Ar—C(=O)—Ar—C(=O)-]$_n$-E where n is an integer from 1 to 200, e.g. 15 to 200 or 20 to 200, especially 30 to 150, particularly preferably 30 to 60, e.g. around 40 or 50 and E is an amine functional group as herein described, especially —$NH_2$.

In a particularly preferred aspect, the functionalised polymer or copolymer of the present disclosure has the following structure:

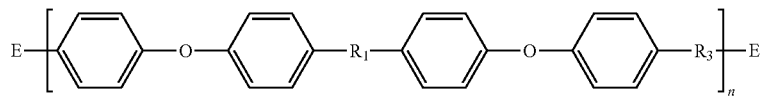

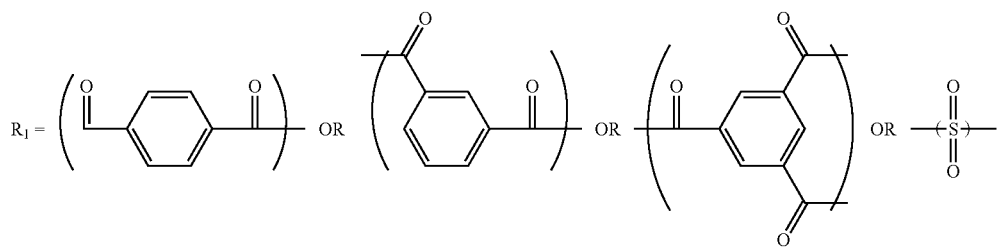

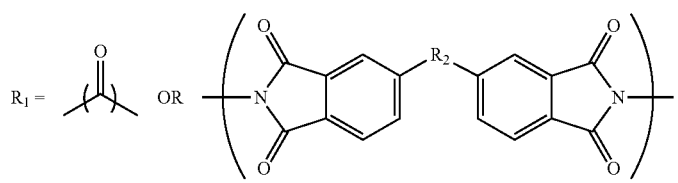

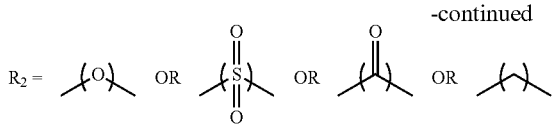

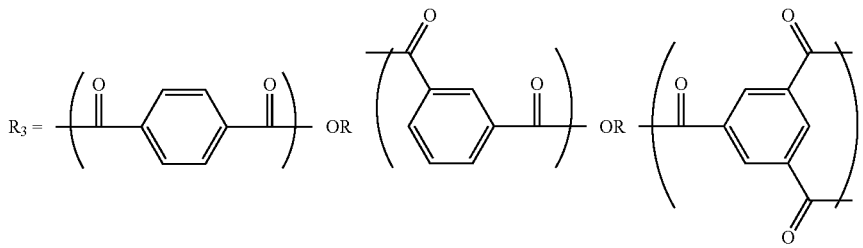

where E is an amine functional group or protected amine, preferably NH₂, as described herein and n is as described above, preferably 15 to 200.

Amine-functionalised monomers and oligomers form a further aspect of the present disclosure. Thus, viewed from a further aspect, the present disclosure provides oligomer derivatives of the polymers and copolymers herein described, e.g. amine-functionalised (e.g. amine-terminated) aryletherketone monomers or oligomers, or imide- or sulphone-derivatives thereof. Where more than one etherketone unit is present, the compound may be monofunctional, bifunctional, trifunctional or multifunctional.

Particularly preferred monomer/oligomer compounds are those according to the following formulae (and imide- or sulphone-derivatives thereof):

E-[-Ar—O—Ar—C(=O)-]$_n$-E
E-[-Ar—O—Ar—C(=O)—Ar—C(=O)-]$_n$-E
E-[—Ar—O—Ar—O—Ar—C(=O)-]$_n$-E
E-[—Ar—O—Ar—O—Ar—C(=O)—Ar—C(=O)-]$_n$-E
E-[—Ar—O—Ar—C(=O)—Ar—O—Ar—C(=O)—Ar—C(=O)-]$_n$-E where n is an integer from 1 to 20, e.g. 1 to 10, especially 1 to 5, particularly preferably 2 to 4 and E is an amine functional group or protected amine as herein described, especially —NH₂, especially wherein the compound is obtained or obtainable by a method comprising the step of reacting a monomer system in a reaction medium comprising:

(i) a capping agent comprising —NR₂, —NRH or a protected amine group.
(ii) a Lewis acid and
(iii) and a controlling agent comprising an aromatic carboxylic acid, an aromatic sulphonic acid, or a derivative thereof.

Especially preferred monomers/oligomers according to the present disclosure are the following:

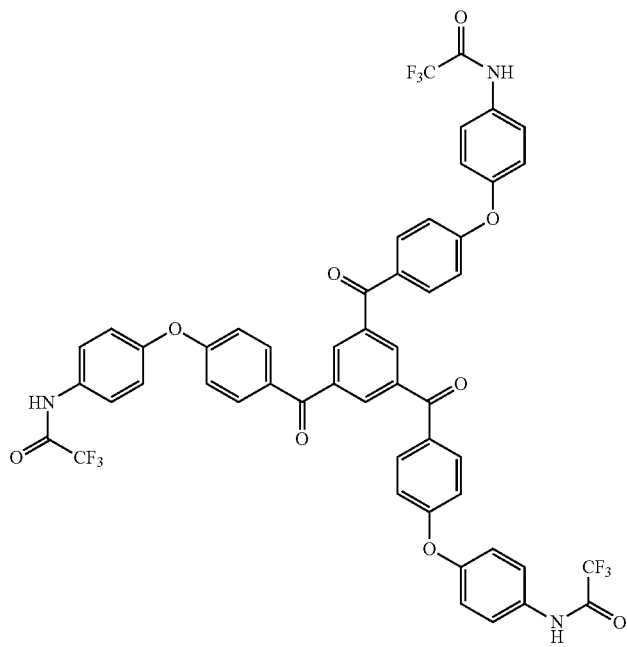

(1)

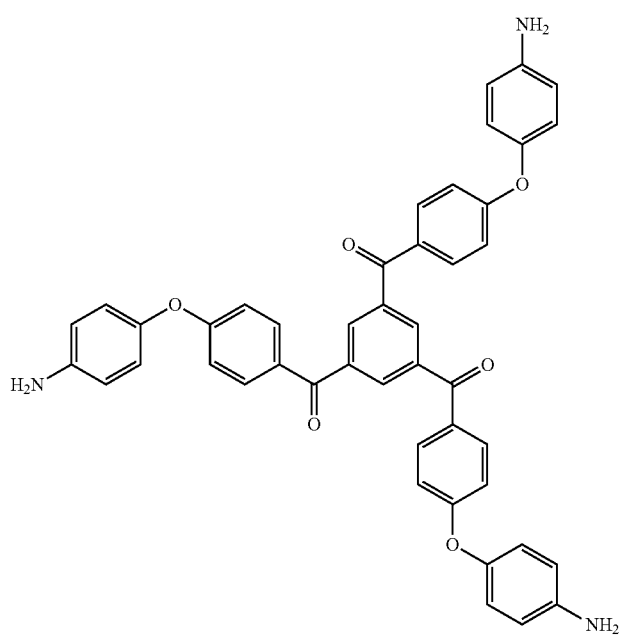

(2)

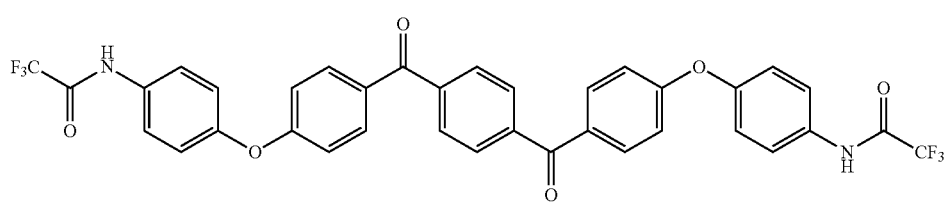

(3)

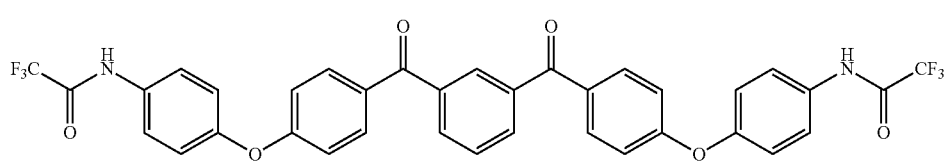

(4)

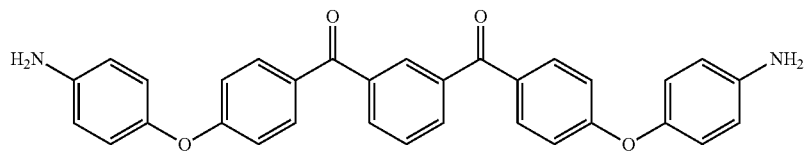

(5)

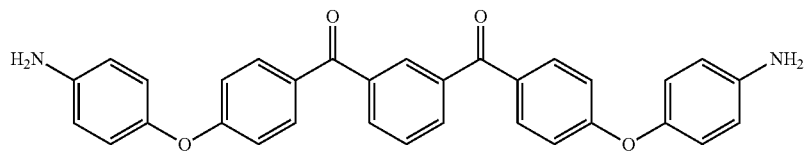

(6)

The functionalised compounds of the present disclosure are produced using a process which involves use of a capping agent. The capping agent comprises —NR$_2$, —NRH or a protected version of the amine group which is intended to functionalise the polymer, copolymer, monomer or oligomer. Certain protected capping agents are novel and form a further aspect of the present disclosure. Preferably, the capping agent comprises a protected amine group.

Without wishing to be bound by theory, it is thought that, if not protected, then any amine groups (especially those comprising —NH$_2$) involved in the polymerisation reaction would react with the carboxylic acid chloride monomers to give an amide linkage in the polymer chain that is unstable compared to a ketone group. The capping agents of the present disclosure therefore comprise, e.g. include, —NR$_2$, NRH or protected amine functional groups (preferably protected amine groups), the protecting group functioning to protect the eventual amine groups during polymerisation. The use of a capping agent comprising —NR$_2$, —NRH or a protected amine, in the production of the polyaryletherketones and their copolymer, monomer and oligomer analogues herein described is novel and thus forms a further aspect of the present disclosure. Capping agents comprising leaving groups (e.g. those comprising protected amine groups) are especially preferred. Capping agents comprising hydroxyl groups (—OH) are less preferred.

Especially suitable capping agents of the present disclosure are of general formula $(Z)_a$—Ar—$(X)_b$ wherein:
  each X is independently selected from —O—Ar, —C(=O)Cl, —C(=O)—Ar—O—Ar and —O—Ar—[—C(=O)—Ar—O—Ar—]$_c$—H where each Ar is independently as defined herein;
  c is an integer, e.g. 1 to 10, preferably 1 to 4,
  Z is —NR$_2$, —NRH or a protected amine group, e.g. each Z is independently selected from —NR$_2$, —NRH, —NHL, —NRL or —NL$_2$ (preferably —NHL) and L is a leaving group, such as an acetyl, haloacetyl (e.g. trifluoroacetyl), carbonate (e.g. t-Boc), sulphonyl, halosulphonyl, —SO$_2$—R, e.g. —SO$_2$—CH$_3$, —SO$_2$—CF$_3$ etc. (carbonate groups such as t-Boc are less preferred);
  each R group is independently as defined herein, i.e. an aliphatic or aromatic group;
  a is 1 to 5, preferably 1, 2 or 3, especially 1 and
  b is 1 to 5, preferably 1, 2 or 3, especially 1.

In one embodiment, where Z is NL$_2$, the two leaving groups can be linked to form an imide, e.g. Z is of the following structure:

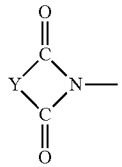

Where Y is a linker group, especially an aryl group (especially phenyl), —(CH$_2$)$_n$— or —(CF$_2$)$_n$—, where n is an integer, preferably 2 to 6. A preferred capping agent of this type is the following, which is available from Molport.

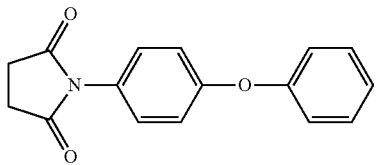

Where R is an aromatic group, it is preferably Ar as herein described (especially phenyl). Where R is an aliphatic group, it is preferably selected from alkyl groups, e.g. C1-6 aliphatic groups, especially methyl or ethyl groups.

In the case where the capping agent comprises —NR$_2$ or —NRH, each R group is independently as defined herein, i.e. R is independently selected from an aliphatic or aromatic (e.g. Ph) group, preferably aliphatic, e. g. alkyl groups, e.g. C1-6 aliphatic groups, especially methyl or ethyl groups.

Preferably, the capping agent is of formula Z-Ph-O-Ph.

Particularly preferably, Z is a haloacetyl protected amine group, e.g. —NH$_n$R, especially, a trifluoroacetamide group.

Preferred capping agents include the following compound and its acetyl equivalent, i.e. compounds of the above formula where n is 1, Ar is Ph and R is acetyl or trifluoroacetyl:

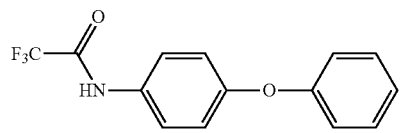 [SMILES: O=C(Nc1ccc(Oc2ccccc2)cc1)C(F)(F)F]

(Referred to as CF$_3$-EC or 2,2,2-trifluoro-N-(4-phenoxyphenyl)acetamide)

The trifluoroacetyl group has been found to be particularly easy to remove during the acid/base work-up.

Other preferred capping agents include H$_3$C—C(=O)N(H)PhC(=O)Cl, protected 3,5-diaminodiphenylether and derivatives thereof.

The capping agents of the present disclosure can be prepared from readily available materials such as aminobenzoic acid, diaminobenzoic acid and diphenylether.

While the functional groups of the present disclosure are preferably present at the chain end of the compound, functionality pendant to the chain is also an aspect of the present disclosure. In this case, rather than a capping agent (which adds functionality to the end of the chains) a functionalised monomer is used. The amine functional group of the monomer must be protected in order to avoid unstable amide linkages being formed. Suitable monomers are iso- or terephthalic acid chlorides comprising protected amine groups as described above. For example, the amine group of 5-aminoisophthalic acid may be protected prior to conversion of the molecule to the acid chloride. This can then be used in place of some of the terephthaloyl or isophthaloyl chloride monomers when preparing the PAEKs of the present disclosure.

An advantageous feature of the processes of the present disclosure is that the leaving group of the capping agent (i.e. L) is removed during standard work-up procedures following the polymerisation. There is thus no need for a separate "deprotection" step.

Typical work-up conditions which result in removal of the leaving group are the use of water, or acidic/basic aqueous solutions, e.g. solutions of HCl or NaOH. The water or solution is typically at a temperature of 0 to 100° C. at atmospheric pressure, preferably 20 to 100° C., e.g. 50 to 80° C. In some aspects, work-up can take place under pressurised conditions, e.g. at pressures of 200 kPa.

A representative workup procedure for a PEKK polymerisation carried out in a one liter reactor is as follows:
  Stand in deionised water overnight;
  Filtered and slowly added to 1.5 liters of stirred, hot deionised water to remove the residual dichloromethane
  1.5 liters of deionised water and 100 ml concentrated hydrochloric acid are added, boiled for 1 hour, filtered, washed with 500 ml deionised water, filtered;
  1.5 liters of deionised water, boiled for 1 hour, filtered, washed with 500 ml deionised water, filtered;
  1.5 liters deionised water made to pH 13 with ammonia solution (~30 ml), boiled for 1 hour, filtered, washed with 500 ml deionised water, filtered;

1.5 liters deionised water, boiled for 1 hour, filtered, washed with 500 ml deionised water, filtered;
Off-white PEKK powder isolated.

The monomer system used in the methods herein described comprises monomers suitable for polymerisation or co-polymerisation in order to produce a polyaryletherketone, or imide- or sulphone-copolymer thereof. Such monomer systems and combinations would be readily apparent to the person skilled in the art.

Preferred monomers may include but are not restricted to:

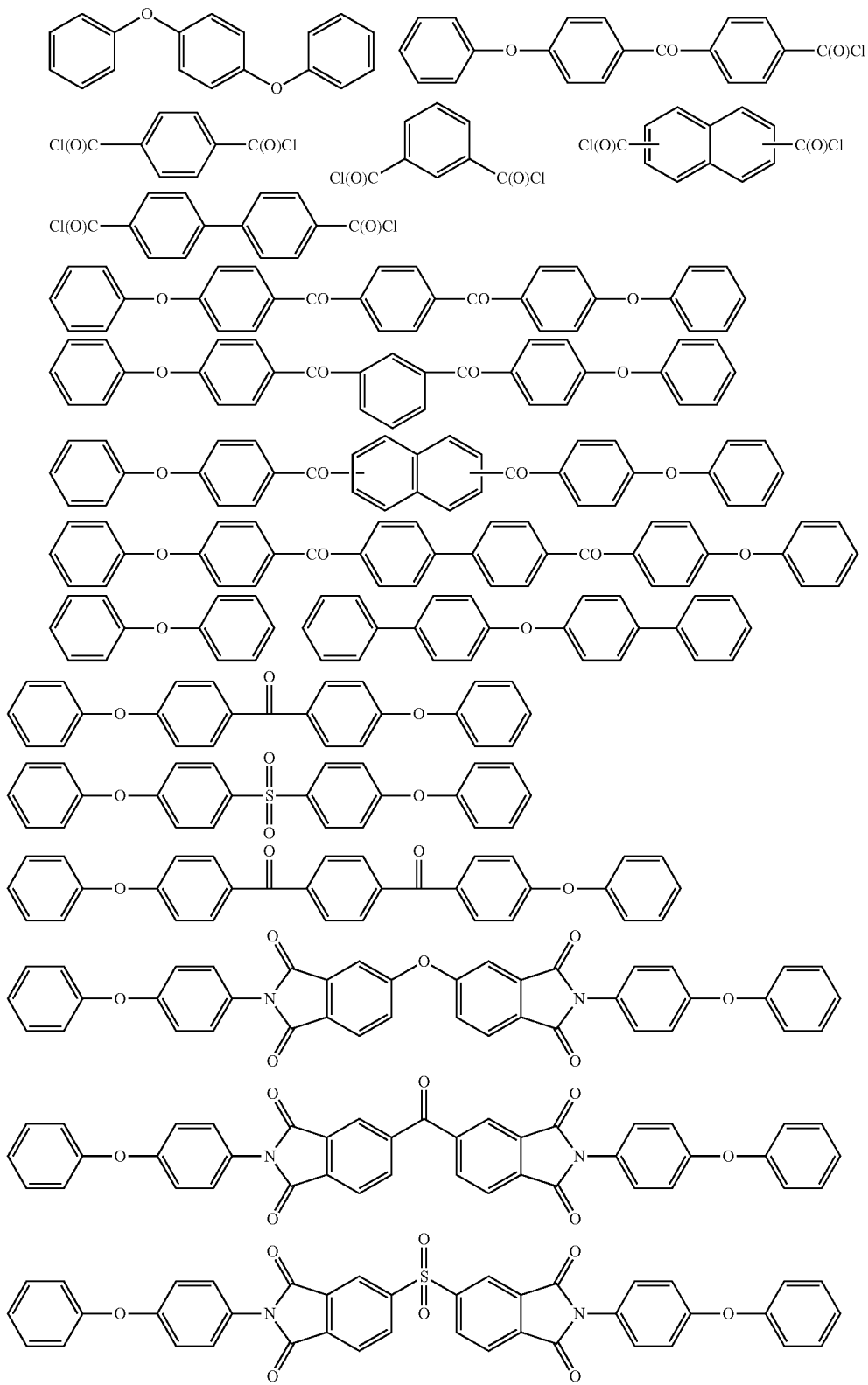

-continued
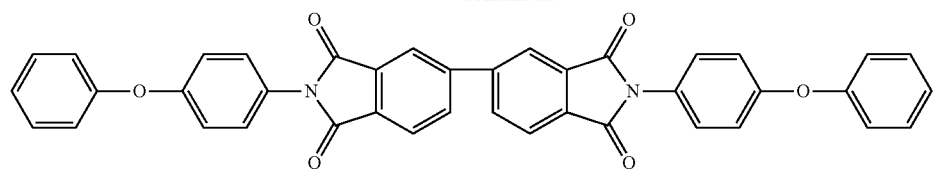 [SMILES: O=C1c2ccc(-c3ccc4c(c3)C(=O)N(c3ccc(Oc5ccccc5)cc3)C4=O)cc2C(=O)N1c1ccc(Oc2ccccc2)cc1]
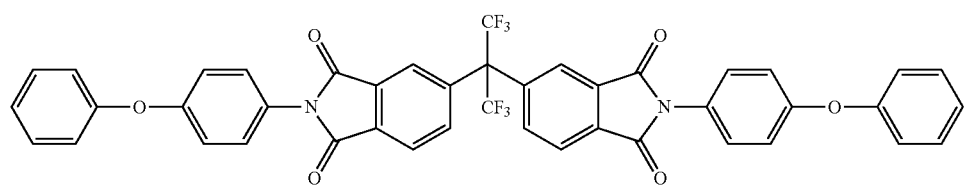 [SMILES: O=C1c2ccc(C(c3ccc4c(c3)C(=O)N(c3ccc(Oc5ccccc5)cc3)C4=O)(C(F)(F)F)C(F)(F)F)cc2C(=O)N1c1ccc(Oc2ccccc2)cc1]
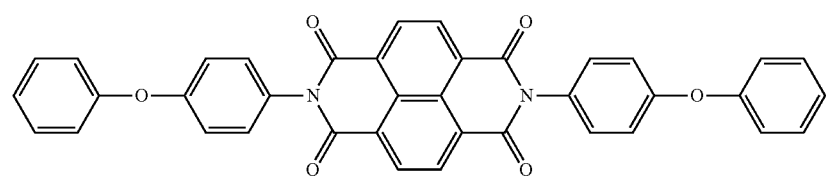 [SMILES: O=C1c2ccc3c4c(ccc(c24)C(=O)N1c1ccc(Oc2ccccc2)cc1)C(=O)N(c1ccc(Oc2ccccc2)cc1)C3=O]
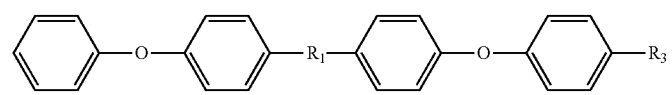
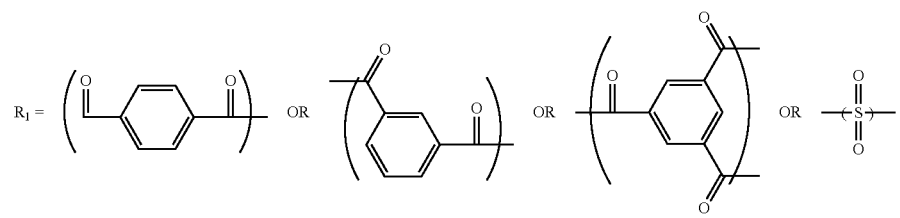
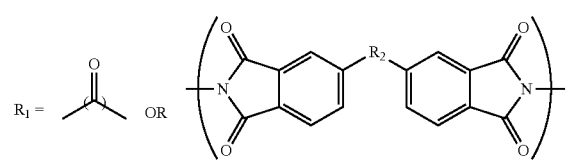
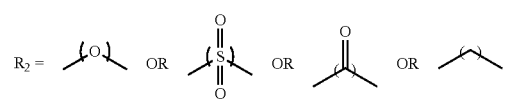
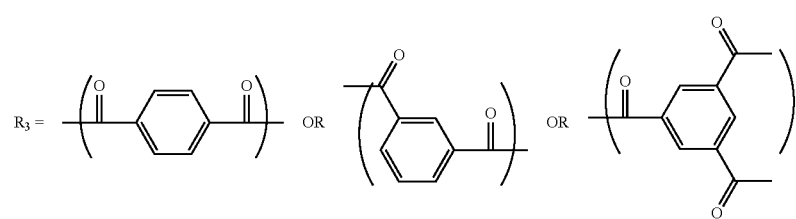

Preferably, at least one of R1 and R3 is the branch unit:

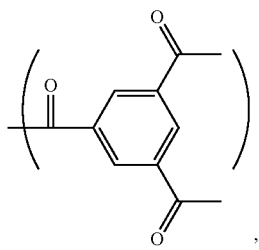

Where branched units are present, they are preferably present in a molar percentage of 0.5% to 25% (i.e. 0.5 to 25 M %).

Preferred monomers may include iso and terephthaloyl halides and phthaloyl halides (i.e. the 1,2 substituted version), preferably iso and terephthaloyl halides, preferably chlorides and 1,4-bis(4-phenoxybenzoyl)benzene.

Especially preferred monomers are the following:

TPC

IPC

NAC
(numbers will give the positions of the substitution e.g 2,6 or 1,4)

EKE

ESE

EKKE

EIEIE

EIKIE

EISIE

-continued

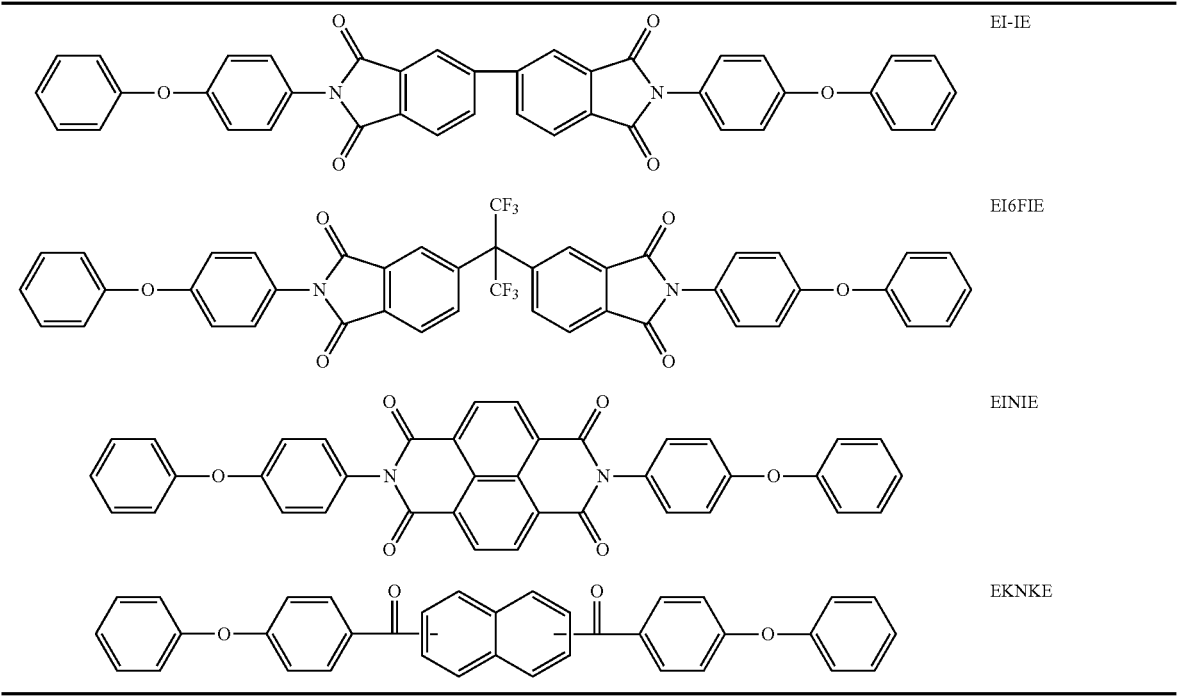

Preferred monomers for the production of the copolymers of the present disclosure include the following (i.e. the copolymer comprises an aryletherketone repeat unit and one or more of the following repeat units):

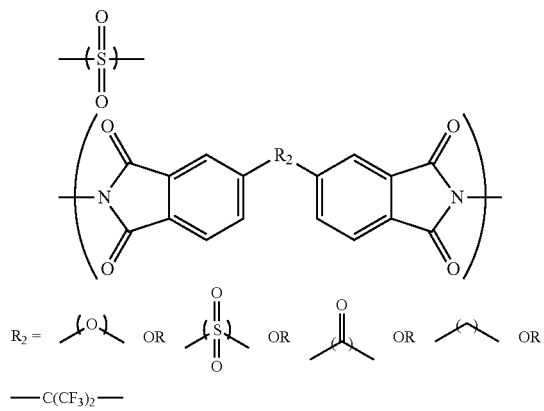

It has been found that those PEK-Imide copolymers that have electron withdrawing groups between the imide units (—C(=O)— and —SO$_2$—) can result in the products being melt unstable at certain processing temperatures. This can also be the case where the imide unit is in the form -imide-C$_6$H$_2$-imide-. Preferably R$_2$ in the above formula is therefore either electron donating or electron neutral, e.g. a bond, ether, or —C(CF$_3$)$_2$— as these have been found to be the most stable.

In an especially preferred aspect of processes of the present disclosure for making copolymers, the reaction medium comprises, in addition to the Lewis acid, the controlling agent and capping agent, a compound comprising an aromatic moiety and more than one reactive carbonyl group (e.g. more than one carboxylic acid halide group). In some aspects, this compound can be used as an alternative to the monomer system suitable for forming aryletherketone linkages. Such compounds facilitate reaction between the aryletherketone and non-aryletherketone components of the copolymers and are especially preferred where one or more of the monomers are not self-polymerising. Suitable compounds include multifunctional (especially difunctional or trifunctional) aromatic carboxylic acid halides, especially aromatic di- or tri-carboxylic acid halides, e.g. one or more of the following (where Cl is preferred but may be replaced by any other halide):

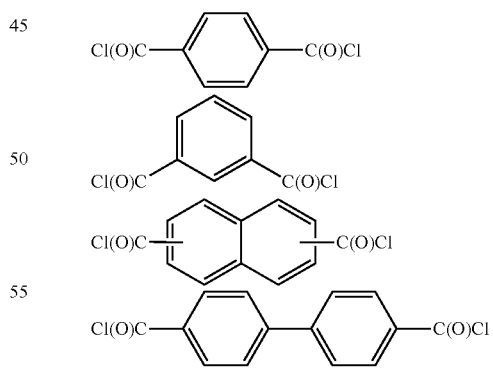

Particularly preferred compounds for this aspect are iso and terephthaloyl halides, preferably chlorides. This aspect of the present disclosure is especially preferred where one or more of the monomers is not self-polymerising as the ketone groups of the monomer participate in the reaction.

Whilst the above-listed chlorides are preferred, other acid halides, particularly the fluorides and the bromides, may also be used. Generally, the chlorides are preferred due to their availability and reactivity. Other groups that are potentially displaceable under Friedel-Crafts conditions may also be used. These might include groups such as —OR, where R is methyl, ethyl, isopropyl or other lower alkyl.

The combinations of monomers suitable for producing the polymer materials herein described would be readily apparent to a person skilled in the art, as would the relative proportions of the monomers.

Self-condensing monomers such as Ph-O-Ph-C(=O)—Cl (4-phenoxybenzoyl chloride) and Ph-O-Ph-N(C=O)$_2$Ph-C(=O)Cl, i.e.:

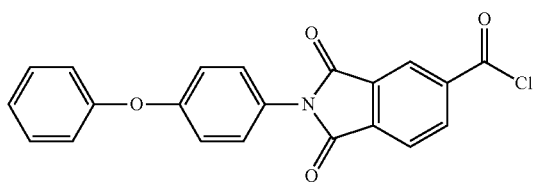 [SMILES: O=C(Cl)c1ccc2c(c1)C(=O)N(c1ccc(Oc3ccccc3)cc1)C2=O]

are also suitable. For example, monomers with repeating units "EKK" can be polymerised alone, i.e. without a co-monomer, to produce PEKK.

The proportion of 1,4-linked aromatic (e.g. phenyl) rings in polyaryletherketones greatly influences the characteristics of the resulting polymer and the size of the particles formed (e.g. its processability, glass transition temperature and its crystalline melting point, even to the extent of producing an amorphous PEKK etc.). Depending on the intended use for the polymer produced, the characteristics can be modified by changing the proportion of 1,4-linked aromatic rings in the polymer. This may be achieved by the use of monomers comprising 1,3-substituted aromatic rings. For example, isophthaloyl halides such as isophthaloyl chloride can be used as monomers and the amounts chosen in relation to the other monomers in order to produce a polymer with the desired characteristics. Preferably the monomers are chosen such that the proportion of 1,3-linked aromatic rings in the resulting polymer is 0 to 100%, more especially 0 to 50% or 0 to 40%, e.g. 5 to 50%, particularly 20 to 40%, e.g. about 30%. All percentages and ratios are by weight, unless otherwise specified. The proportion of 1,4 (tere-, or "T") to 1,3 (iso-, or "I")-linked aromatic rings in the resulting polymer can also be represented as a tere-:iso-, or "T:I" ratio and is preferably within the range of 100:0 to 60:40.

Particularly preferably the monomer system comprises bis 1,4-(4-phenoxybenzoyl)benzene and terephthaloyl halide and isophthaloyl halides (e.g. a 60:40 mixture of tere- and iso-phthaloyl chloride) in a 1:1 ratio by weight. This would produce an 80:20 PEKK polymer, i.e. the iso-linked units would be present in 20% by weight in the final polymer material.

The ratio (e.g. molar ratio) of aryletherketone units to non-aryletherketone units (i.e. sulphone or imide groups) in the copolymers and oligomers of the present disclosure is in the range of 1:99 to 99:1, e.g. 20:80 to 80:20, especially 30:70 to 70:30, 40:60 to 60:40 or 50:50. The most preferable ratios are 30:70 and 70:30.

The temperature at which the reaction is conducted can be from about −50° C. to about +150° C. It is preferred to start the reaction at lower temperatures, for example at about −50° C. to about −10° C., particularly if the monomer system contains highly reactive monomers. After polymerisation has commenced, the temperature can be raised if desired, for example, to increase the rate of reaction. It is generally preferred to carry out the reaction at temperatures in the range of between about −30° C. and +25° C., particularly +20° C.

The fact that the processes of the present disclosure can be carried out at relatively low temperatures renders the present disclosure are particularly useful for the production of block copolymers as the two (or more) types of monomer can be added sequentially by opening the reactor once the first component has reacted. The high temperatures (e.g. 350° C.) required for nucleophilic processes render this opening of the reactor problematic (e.g. for safety reasons), the low temperature processes of the present disclosure solve this problem. Having calculated the monomer ratios for block length required (e.g. for a PEKK block, the EKKE monomer to KK monomer ratio), the first monomer system is polymerised (preferably in the presence of the Lewis acid and the controlling agent). After that has been given a suitable amount of time to polymerise, which, using the processes of the present disclosure can be carried out at +20° C., the other monomers can be added (following optional cooling to e.g. +5° C.). Addition of further monomers is ideally carried out gradually so as to prevent the reaction temperature rising excessively.

For the production of copolymers, the monomer system suitable for forming aryletherketone units is polymerised before, after, or at the same time as, the comonomer (i.e. the unit or units which form the non-aryletherketone units of the copolymers of the present disclosure). Moreover, the monomer system suitable for forming aryletherketone units may be polymerised in the same vessel or a different vessel to polymerisation of the comonomer For the formation of random copolymers, all types of monomer may be added and/or polymerised together, i.e. they are polymerised simultaneously in the same vessel. For the formation of block copolymers, the types of monomer are polymerised separately, e.g. at different times and/or in different vessels. For example, at least one type of monomer is added after at least one other has polymerised, e.g. the monomer system suitable for forming aryletherketone units is polymerised before or after the comonomer (or vice versa). Alternatively, in an embodiment especially suited to the formation of block copolymers, the monomers for forming aryletherketone units and those for forming non-aryletherketone units comonomer (i.e. the imide and/or sulphone monomer) are polymerised in different vessels and then mixed together to form the copolymers of the present disclosure.

Thus, in a preferred aspect, the monomer system suitable for forming aryletherketone units is polymerised before the comonomer (i.e. the imide and/or sulphone monomer) is added to the reaction medium, or the comonomer is polymerised before the monomer system suitable for forming aryletherketone units is added to the reaction medium. In a further aspect, the monomers are polymerised in different vessels prior to mixing to form the copolymers of the present disclosure.

In one aspect of the present disclosure (particularly for the production of copolymers), the monomer system suitable for forming aryletherketone units may be replaced by one or more monomers which consists essentially of aryl and ketone groups or consists essentially of aryl and ether groups, preferably one consisting of aryl and ketone groups, especially a "KK" unit such as a phthaloyl halide as herein described. In such an aspect the comonomer which comprises non-aryletherketone units should contain ether linkages such that the eventual copolymer contains both ether and ketone linkages.

Preferably, the method of the present disclosure employs a controlling agent. Preferably, the controlling agent is a Lewis base or an aromatic carboxylic acid, aromatic sulphonic acid or derivatives thereof.

Where the controlling agent is an aromatic carboxylic acid, aromatic sulphonic acid or derivatives thereof, such acids may comprise 1, 2 or 3 carboxylic or sulphonic acid groups on an aromatic ring (i.e. these may be mono-, di- or tri-acids). Derivatives of such acids include metals salts and esters.

Preferred controlling agents for use in the method of the present disclosure include the following:

(i) $Ar'(COOX)_y$;
(ii) $Ar'(SO_3X)_y$;
(iii) $(Ar'COO^-)_z M^{z+}$; or
(iv) $(Ar'SO_3^-)_z M^{z+}$ wherein Ar' is an aromatic group compatible with the remaining components of the reaction medium;
each X independently is a hydrogen atom or an organic group (R);
each y independently is 1, 2 or 3;
each M independently is a metal ion and
each z independently is an integer equal to the charge on the metal ion ($M^{z+}$).

The aromatic group of the controlling agent (i.e. Ar') may be selected from substituted and unsubstituted mononuclear (e.g. phenyl) and substituted and unsubstituted polynuclear aromatic moieties. Preferably the aromatic group of the controlling agent is an optionally substituted phenyl group. Preferred substituents may include halogen (e.g. F, Cl, Br, I), nitro, cyano, alkyl (e.g. $C_{1-6}$ alkyl) and the like. Alkyl substituents are preferred, e.g. methyl, ethyl, etc. Where substituents are present, these are preferably electron-withdrawing groups which deactivate the ring to electrophilic attack.

When X=R, the organic group R is preferably a straight-chained or branched $C_{1-6}$ alkyl group, i.e. the controlling agent is an alkyl ester of an aromatic carboxylic acid or aromatic sulphonic acid. More preferably, R is $C_{1-4}$ alkyl. e.g. methyl.

Especially preferred controlling agents for use in the present disclosure include benzoic acid, chlorobenzoic acid (e.g. 4-chloro benzoic acid), methyl benzoic acid (e.g. 4-methyl benzoic acid), sodium benzoate, magnesium benzoate, aluminium benzoate, methyl benzoate and benzene sulphonic acid. Particularly preferably, the controlling agent is benzoic acid.

Mixtures of two or more controlling agents may also be used, if desired.

In some aspects of the present disclosure the controlling agent is a Lewis base. The term "Lewis base" refers to a substance capable of donating an unshared electron pair to a Lewis acid. Mixtures of two or more Lewis bases can be used if desired.

Typical Lewis bases which can be employed include, amides, amines, esters, ethers, ketones, nitriles, nitro compounds, phosphines, phosphine oxides, phosphoramides, sulfides, sulfones, sulfonamides, sulfoxides and halide salts. More specifically, the Lewis base may be selected from acetone, benzophenone, cyclohexanone, methyl acetate, ethylene carbonate, N-methylformamide, acetamide, N,N-dimethylacetamide, N-methylpyrrolidone, urea, tetramethylurea, N-acetylmorpholine, dimethyl sulfoxide, N,N-dimethylformamide, diphenyl sulfone, N,N-dimethylmethanesulfonamide, phosphoryl chloride, phenylphosphonyl chloride, pyridine-N-oxide, triphenylphosphine oxide, trioctylphosphine oxide, nitropropane, nitrobenzene, benzonitrile, n-butyronitrile, methyl ether, tetrahydrofuran, dimethyl sulfide, trimethylamine, N,N,N',N'-tetramethylethylenediamine, N,N-dimethyldodecylamine, imidazole, pyridine, quinoline, isoquinoline, benzimidazole, 2,2'-bipyridine, o-phenanthroline, 4-dimethylaminopyridine etc. In addition to covalent organic compounds, suitable Lewis bases include inorganic salts which can form complexes with Lewis acids, for example, chlorides, such as trimethylammonium chloride, tetramethylammonium chloride, sodium chloride or lithium chloride, perchlorates, trifluoromethanesulfonates etc.

Particularly preferred Lewis bases are dimethylsulphonei, N-methylformamide, N,N-dimethylformamide, N,N-dimethylacetamide, 1-methyl-2-pyrrolidone, tetramethylene sulfone (also known as sulfolane), n-butyronitrile, dimethyl sulfide, imidazole, acetone, benzophenone, trimethylamine, trimethylamine hydrochloride, tetramethylammonium chloride, pyridine-N-oxide, 1-ethylpyridinium chloride, lithium chloride, lithium bromide, sodium chloride, sodium bromide, potassium chloride, potassium bromide and mixtures thereof.

The amount of controlling/dispersing agent present is preferably from 0.1 to 6 equivalents per equivalent of acid halide groups present in the monomer system. Typical ranges of ratio of moles of controlling agent to moles of acid halide groups present in the monomer system are from 0.1 to 10, preferably 0.5 to 7, especially 0.7 to 5, particularly preferably 1.5 to 2. Amounts greater than 5 equivalents could be employed, if desired, e.g. up to 10 equivalents, e.g. 7 equivalents. However, no additional controlling or dispersing effect is usually achieved by adding larger amounts and it generally means that more Lewis acid is also required. Thus, it is preferred to use no more than 5 equivalents, more preferably between 0.5 and 4 equivalents and especially 1 to 3 or between 0.5 and 2 or 2 to 4 (e.g. 2 to 3) equivalents per equivalent of acid halide groups. A particularly preferred amount of Lewis base controlling agent is 1 equivalent per equivalent of acid halide groups, whereas for the carboxylic acid/sulphonic acid type controlling agent, 2 equivalents per equivalent of acid halide groups are especially preferred.

The actual amount of controlling agent added depends upon, inter alia, the particular controlling agent used, the nature of the monomers present and the type and amount of Lewis acid employed. The ranges given particularly apply to the controlling agents containing one acid or base acid functionality, e.g., those listed as (i) to (iv) above where y or z is equal to 1. For those controlling agents containing more than one acid or base group per molecule, e.g. where y or z is not 1, the equivalents of controlling agent to acid halide groups in the monomer systems may be adjusted accordingly.

Many of the prior art polymerisation processes which employ controlling agents are unreliable to the extent that it cannot be predicted whether a complexed gel or dispersion will result. Mixed solvent systems have been used in order to promote dispersion over gel formation. Whilst such systems may be used in the methods herein described, this is not essential to achieve the desired effects. The present process therefore allows the use of a single solvent (e.g. dichloromethane) which makes solvent removal easier; the dispersion of droplets is easier to control, e.g. benzoic acid can give dispersions of the polymer PEKK in pure dichloromethane without the need for further diluents such as cyclohexane. The fact that solvent mixtures are not required makes solvent removal easier (e.g. dichloromethane can be distilled off at 41° C. with extremely high recovery rates).

Use of a single solvent in the processes of the present disclosure is therefore preferred.

Moreover, controlling agents such as benzoic acid can also be readily recovered for future use when carrying out the methods of the present disclosure. The recovery of the controlling agent benzoic acid is facilitated by the fact that the acid has very low solubility in cold water but high solubility in hot water. Thus after heating the polymer slurry in water after decomplexation, the polymer can be recovered by filtration and on allowing the filtrate to cool the benzoic acid crystallises out facilitating its recovery for future use. An alternative method to recover the benzoic acid would be to add sufficient sodium hydroxide to form sodium benzoate which is water soluble (1 g in 2 mL of water), filter and isolate the polymer and then add an acid such as hydrochloric acid to the filtrate to reform benzoic acid which would precipitate from the filtrate.

A further advantage of the present disclosure is the reduction in the amount of water necessary to remove the catalyst residues and controlling agents when compared to that necessary using the gel and tube process. In the complexed gel and tube process the polymer after decomplexation has a very low bulk density, sometimes as low as 0.08 g/mL, thus requiring the use of large work-up vessels and large quantities of water to afford a mobile slurry. Using the dispersion method of the present disclosure (i.e. that involving an aromatic carboxylic acid or aromatic sulphonic acid or derivatives thereof as controlling agent) the bulk density of the isolated polymer is much higher thus permitting the use of much lower volume work-up vessels and significantly reducing the amount of water required to purify the isolated polymer.

The ability to recover the solvent and the controlling agent and the reduction in the amount of water required in the process provides a more sustainable and cost-effective process than the prior art methods which require solvent mixtures, controlling agents which are difficult to remove and large quantities of water.

Polymerising agents such as terephthaloyl chloride (TPC) and isophthaloyl chloride (IPC) may also be used. This is optional if a self-polymerising monomer is used.

A Lewis acid is used as catalyst. The term "Lewis acid" is used to refer to a substance which can accept a shared electron pair from another molecule. Suitable catalysts for use in the method of the present disclosure include aluminium trichloride, aluminium tribromide, antimony pentachloride, antimony pentafluoride, indium trichloride, gallium trichloride, boron trichloride, boron trifluoride, zinc chloride, ferric chloride, stannic chloride, titanium tetrachloride, and molybdenum pentachloride. Preferably the catalyst is substantially anhydrous aluminium trichloride.

The amount of Lewis acid catalyst used will vary depending on the particular monomers and the reaction medium selected. Typically, the amount of Lewis acid required is calculated on the basis of one Lewis acid for each ketone unit, plus an amount equimolar to that of Lewis base, or controlling agent, plus up to 20% excess. Larger excesses can be used but offer no significant advantage.

Alternative catalyst systems for electrophilic processes include use of trifluoromethanesulphonic acid, with and without $P_2O_5$, and those using mixtures of $CF_3$—COOH and $CF_3$—$SO_3H$ with and without $P_2O_5$. Terephthalic and isophthalic acids can be used in these super acid mixtures. For example, PEKK can be produced from EKKE plus terephthalic and isophthalic acids in $CF_3$—$SO_3H$, with the $CF_3$—$SO_3H$ is used as the solvent. The $CF_3$—$SO_3H$ reacts with the tere/iso acids to give the mixed carboxylic-sulphonic anhydride $CF_3$—$SO_2$—O—CO-Ph-CO—O—$SO_2$—$CF_3$ which in the presence of an electron rich —H group as in EKKE then eliminate $CF_3$—$SO_3H$ and forms a ketone unit. As an alternative to $CF_3$—$SO_3H$, $CF_3$—COOH with some $CF_3$—$SO_3H$ plus $P_2O_5$ to remove the water produced may be used.

If necessary, capping agents which do not contain an amine group (protected or otherwise) may be added to the polymerisation reaction medium to cap the polymer on at least one end of the polymer chain. This terminates continued growth of that chain and controls the resulting molecular weight of the polymer. Use of these capping agents may therefore be used to produce polymers within a selected narrow molecular weight range. In this aspect, both nucleophilic and electrophilic capping agents may be used to cap the polymer at each end of the chain. Such capping agents, if used, will be used in addition to the capping agent which comprises —$NR_2$, —NRH or a protected amine, which is used to produce the functionalised compounds of the present disclosure. Preferred nucleophilic capping agents of this type are 4-chlorobiphenyl, 4-phenoxybenzophenone, 4-(4-phenoxyphenoxy)benzophenone, biphenyl 4-benzenesulphonylphenyl phenyl ether, and the like. Typical electrophilic capping agents include benzoyl chloride, benzenesulfonyl chloride and the like.

Preferred solvents for the electrophilic polymerisation reaction are halogenated hydrocarbons (e.g. tetrachloroethylene, 1,2,4-trichlorobenzene, o-difluorobenzene, 2-dichloroethane dichlorobenzene, 1,1,2,2,-tetrachloroethane, particularly ortho-dichlorobenzene, dichloromethane etc.). Additionally, or alternatively, non-chlorinated diluents may be used such as cyclohexane, carbon disulphide, nitromethane, nitrobenzene, HF. Dichloromethane (DCM) is particularly preferred for use in the present disclosure.

A non-protic diluent can also be employed, if desired. Advantageously, the diluent should be inert towards Friedel-Crafts reactions. Other diluents include, for example, dichloromethane, carbon disulphide, o-dichlorobenzene (i.e. ortho- or 1,2-dichlorobenzene), 1,2,4-trichlorobenzene, o-difluorobenzene, 1,2-dichloroethane, cyclohexane, 1,1,2,2,-tetrachloroethane and mixtures thereof. Whilst these additional diluents may be used they confer no significant advantage to the process and may result in difficulty in separating the diluents used for further use. A process which is substantially free from co-solvent is therefore a preferred aspect of the present disclosure.

The amount of any diluent used is most preferably in the range of 10 mL to 400 mL, especially 50 mL to 200 mL of diluent to 10 g of polymer. Both higher and lower concentrations (preferably higher) may be used if required.

When electrophilic polymerisation is complete, the polymer contains Lewis acid catalyst complexed to any carbonyl groups (and possibly also to ether groups). The catalyst residue must be removed, i.e. the Lewis acid must be decomplexed from the polymer and removed. Decomplexation can be accomplished by treating the polymerization reaction mixture with a decomplexing base after completion of polymerization. The decomplexing base must be at least as basic towards the Lewis acid as the basic groups on the polymer chain.

The amount of decomplexing base used should be in excess of the total amount of bound (complexed) and unbound Lewis acid present in the reaction mixture and is preferably at least twice the total amount of Lewis acid. Typical decomplexing bases which can be used include water, dilute aqueous hydrochloric acid, methanol, ethanol, acetone, N,N-dimethylformamide, N,N-dimethylacetamide, pyridine, dimethyl ether, diethyl ether, tetrahydrofuran, trimethylamine, trimethylamine hydrochloride, dimethyl sulphide, tetramethylene sulphone, benzophenone, tetramethylammonium chloride, isopropanol, acetic acid and the like. Iced water or cooled dilute hydrochloric acid are preferred for use in the present disclosure.

The electrophilic process can be carried out in a manner similar to standard suspension polymerisation reactions. The reactions are generally carried out in a dry and/or inert, preferably dry, especially dry and inert atmosphere, e.g. reaction vessels may be purged with dry air, nitrogen, argon or $CO_2$. Typically, the catalyst (e.g. $AlCl_3$) is added to the cooled solvent (preferably dichloromethane, preferably cooled to well below room temperature, e.g. −20° C.) followed by the controlling agent (preferably benzoic acid) followed by the monomers and end-capper. Further monomer or monomer mixtures, if required, may then be added in a solution of the same solvent or as solids. The controlling agent may be added earlier or later in the sequence of additions, preferably after the catalyst and before the monomers, provided the temperature of the slurry is kept below −10° C. during the addition, preferably below −20° C. Additional reaction components, e.g. capping agents, additional diluent etc., are typically also added at this stage. The capping agent can be added later, even after the mixture has warmed. This has the effect of altering the molecular weight distribution which can be advantageous in some instances.

When a copolymer is to be produced, the monomer system suitable for forming aryletherketone units is polymerised before, after, or at the same time as, the comonomer. For the formation of random copolymers, all types of monomer may be added and/or polymerised together. For the formation of block copolymers, at least one type of monomer is added after at least one other has polymerised, e.g. the monomer system suitable for forming aryletherketone units is polymerised before or after the comonomer.

The resulting reaction mass is then typically allowed to warm towards room temperature while being stirred vigorously in a suitably baffled reactor. During the polymerisation, any by-products (e.g. condensation products) (e.g. hydrogen chloride) can be trapped and disposed of. After stirring at room temperature for a suitable length of time (in general 4 to 8 hours, preferably 6 hours) work-up/decomplexation can begin by combining the entire reaction mass with decomplexing base (e.g. iced water). Care must be taken to avoid the temperature of the decomplexing mixture rising above room temperature (+25° C.). Prior to decomplexation the reaction mass is typically an orange slurry and after complete decomplexation the mass is usually a snow white/off white slurry. The mass is then typically stirred at or below room temperature to yield the final polymer product.

Solvent removal from this product may be carried out by any conventional method, although typically this will be by distillation. Further purification can be achieved by known methods, e.g. hot filtration of the suspension to yield the polymer product, typically as a snow white/off white residue. Cooling of the combined filtrates, including any acidic washes (e.g. to 5° C.) results in recovery of any benzoic acid used as the controlling agent by crystallisation. Using these methods, up to 95% of the solvent, usually dichloromethane, can be recovered along with up to 90% of the controlling agent (e.g. when the controlling agent is benzoic acid or a benzoic acid derivative).

The polymers produced by way of the methods herein described are considered to form a further aspect of the present disclosure.

Thus, in a further aspect, the present disclosure provides an amine-functionalised (e.g. amine-terminated) polyaryletherketone polymer, or imide- or sulphone-copolymer thereof, obtainable by any process as herein described (preferably in particulate form).

In one aspect, the present disclosure provides particles of an amine-functionalised (e.g. amine-terminated) polyaryletherketone polymer, or imide- or sulphone-copolymer thereof and amine-protected analogues thereof, obtained or obtainable by a method comprising the step of polymerising a monomer system in a reaction medium comprising:
  (i) a capping agent comprising —$NR_2$, —NRH or a protected amine group,
  (ii) a Lewis acid and
  (iii) and a controlling agent comprising an aromatic carboxylic acid, an aromatic sulphonic acid, or a derivative thereof.

A further advantage of the present disclosure is that the process, when carried out with the carboxylic acid or sulphonic acid based controlling agent herein described, can yield polymer particles, i.e. the polymer in particulate form, e.g. spheres of functionalised polyaryletherketones and imide or sulphone-copolymers thereof, e.g. PEKK. The provision of spherical particles directly from the polymer production process is particularly advantageous as it means that costly further processing steps such as grinding and sieving are not necessary. Instead, the process gives spherical particles directly. Moreover, the spherical particles produced according to the present disclosure are more uniform in shape rather than the rough particulates that would be produced by grinding.

Particles of functionalised polyaryletherketones have, until now, been unobtainable, and thus form a preferred aspect of the present disclosure. Therefore, the present disclosure provides particles, e.g. spherical or substantially spherical particles of the amine-functionalised polymers of the present disclosure.

For processes that do not directly result in particles, the resulting polymer materials can be ground to particles if required.

The particle shape may be irregular, e.g. lozenge shaped, fibrous or rod shaped, preferably with an aspect ratio 1.5 to 10 (where R=a/b, "a" is the largest dimension, and "b" is the smallest dimension), however, in preferred embodiments the polymer particles are primarily, i.e. substantially, spherical, preferably substantially spherical in shape with an aspect ratio (R) of about 1 to 1.5. The polymer morphology is in a semi-crystalline state with the degree of crystallinity greater than 5% to impart good chemical resistance and low moisture pick-up. The particles' physical structure may range from being solid (high density; e.g. density of 1.3 g/cc or greater) to cellular (density of <1 g/cc) structure, or a combination of the two.

By "particle size" is meant particle diameter. The particles according to the present disclosure advantageously have particle sizes (e.g. as measured with a Malvern Mastersizer particle size analyser) of 0.1 to 3000 μm, preferably 1 to 500 μm, especially preferably 1 to 100 μm, particularly 10 to 200 μm, e.g. 50 to 100 μm. Preferably the particles have one dimension that is 75 μm or less, e.g. 10 to 50 μm. Especially preferably, the particles are substantially spherical particles having diameter of less than 75 μm.

Preferably, the particles are substantially spherical in shape with an aspect ratio (R) of about 1 to 1.5.

Typically, at least 25% (by volume) of the particles are less than 100 µm in diameter, preferably at least 50%, e.g. at least 75%. Alternatively, or additionally, at least 20% of the particles are less than 70 µm, preferably at least 40%, e.g. at least 60%.

The particles preferably have a coefficient of variation (CV) of less than 20%, e.g. less than 10%, more preferably less than 5%, still more preferably less than 2%. CV is determined in percentage as, CV=100×standard deviation mean where mean is the mean particle diameter and standard deviation is the standard deviation in particle size. CV is preferably calculated on the main mode, i. e. by fitting a monomodal distribution curve to the detected particle size distribution. Thus some particles below or above mode size may be discounted in the calculation which may for example be based on about 90% of total particle number (of detectable particles that is). Such a determination of CV is performable on a Malvern Mastersizer particle size analyser.

Preferably the polymers or copolymers of the present disclosure have a weight average molecular weight (Mw) of at least 8,000, preferably greater than 9,000, especially greater than 10,000, more specifically, in the range of 8,000-162,000, more preferably, 26,000-162,000. The $M_w$ as disclosed herein can be determined by gel permeation chromatography (GPC).

Preferably the polymers or copolymers of the present disclosure have an inherent viscosity (IV) of at least 0.2 dl/g, e.g. at least 0.28 dl/g, especially at least 0.4 dl/g, particularly preferably at least 0.5 dl/g. Preferred ranges are 0.4-1.7 dl/g, e.g. 0.6-1.5 dl/g. IV as discussed herein can be measured by using a conventional viscometer.

Preferably the polymers or copolymers of the present disclosure have a glass transition temperature ($T_g$) of at least 140° C. as measured by differential scanning calorimetry (DSC), more specifically, in the range of 140-178, especially at least 144° C., particularly preferably at least 148° C., e.g. 158-178° C.

The size of the polymer particles may be controlled by varying the amount of dispersant added, amount of polymer per unit volume of solvent, the stirrer speed, the stirrer paddle design, temperature ramp rate, the reactor design and/or the addition of baffles to create turbulence. Other techniques well known in dispersion polymer chemistry may be employed. However, the present inventor has surprisingly found that, not only can the present disclosure provide spherical particles of PAEKs for the first time, but the method allows the particle size (e.g. distribution and/or mean) to be controlled by varying the amount of controlling agent (preferably benzoic acid) used.

It has been found that increasing the amount of carboxylic/sulphonic acid based controlling agent relative to the amount of monomers results in the average particle size decreasing. Typical ranges of ratio of moles of controlling agent to moles of acid halide groups present in the monomer system are described herein.

The actual amount of controlling agent added depends upon, inter alia, the particular controlling agent used, the nature of the monomers present and the type and amount of Lewis acid employed. As noted above, the ranges given particularly apply to the controlling agents containing one carboxylic acid or sulphonic acid functionality, e.g., those listed as (i) to (iv) above where y or z is equal to 1. For those controlling agents containing more than one acid group per molecule, e.g. where y or z is not 1, the equivalents of controlling agent to acid halide groups in the monomer systems may be adjusted accordingly.

The higher relative amounts of controlling agent can produce particles of a smaller mode particle size than the lower amounts of controlling agent. It has been found that controlling the particle size is particularly suited to PAEKs in which the 1,4-linked units are present in 50% or more by weight.

As well as decreasing the size of the particles produced, increasing the relative amount of controlling agent used can result in extremely small particles being formed. For example, particles of less than one micron, i.e. as small as 0.275 µm have been recorded. If very small particles are desired, the amount of controlling agent (and/or other factors known to influence particle size in polymerisation reactions) can be chosen to optimise the amount of smaller particles and the smallest particles removed from the product mixture, e.g. by using conventional techniques such as sieving, air classification (e.g. air elutration), photoanalysis, optical counting methods, electroresistance counting methods, sedimentation techniques, laser diffraction methods, acoustic spectroscopy, ultrasound attenuation spectroscopy etc.

By varying the amount of controlling agent and separating the particles based on their size, the present disclosure allows PAEKs of graded particle sizes to be produced. This lends the polymer to a variety of different applications as the size range of the particles can be controlled to suit the end use. For example, very small (e.g. sub-micron particles) could be used for powder impregnation of composites.

Thus the present disclosure provides a method for producing an amine functionalised polyaryletherketone as herein described, having a selected particle size distribution, said method comprising the following steps:
(i) polymerising a monomer system in a reaction medium comprising:
 (a) a Lewis acid;
 (b) a controlling agent comprising an aromatic carboxylic acid, an aromatic sulphonic acid, or a derivative thereof; and
 (c) a capping agent comprising —NR$_2$, —NRH or a protected amine functional group and
(ii) adjusting the ratio of controlling agent to monomers in the monomer system whereby to control particle size distribution.

Preferably, the particle size is selected by adjusting the ratio of moles of carboxylic/sulphonic acid type controlling agent to moles of acid halide groups present in the monomer system. Typical ratios of moles of controlling agent to moles of acid halide groups present in the monomer system are from 0.1 to 10, preferably 0.5 to 7, especially 0.7 to 5, particularly preferably 1.5 to 2.

Viewed from a further aspect, the present disclosure provides amine-functionalised (e.g. amine-terminated) polyaryletherketone-imide copolymers or polyaryletherketone-sulphone copolymers, and amine-protected analogues thereof.

The above-mentioned polymers and spherical particles of polymer form a further aspect of the present disclosure, as do their uses and articles/composites comprising them. The present disclosure thus provides particles, e.g. substantially spherical particles, of amine-functionalised (e.g. amine-terminated) polyaryletherketone polymer, or imide- or sulphone-copolymer thereof, as herein described.

Compositions comprising functionalised PAEKs as herein described, especially spherical particles of amine-functionalised PAEKs may contain or comprise the particles (e.g. spherical particles) of amine-functionalised PAEKs in a suitable matrix, for example another polymer, such as a thermoplastic or thermoset. The particles can also be utilised as the powders in powder impregnated fibre composites.

The polymer particles may be solid, hollow or porous, e.g. porous with an outer shell. In the case where porous or hollow particles are formed, these may be used to encapsulate or support materials, e.g. active agents in order to impart extra functionality to the polymer. For example, the cellular structure of particles of the present disclosure can allow penetration of liquid thermoset resin to infuse and react to form an interpenetrating network at the article surface The functional groups of the materials of the present disclosure may be used to attach the polymer (e.g. polymer particles) covalently to other materials, e.g. other polymers and can be used, for example, in the production of toughened polymer materials.

The polymers of the present disclosure may be blended with other polymers in order to produce polymer blends suited to a variety of purposes. Moreover, articles comprising the polymers of the present disclosure form a further aspect of the present disclosure.

BRIEF DESCRIPTION OF THE DRAWINGS

The present disclosure will now be further described by the following non-limiting examples and figures.

Figure 1:
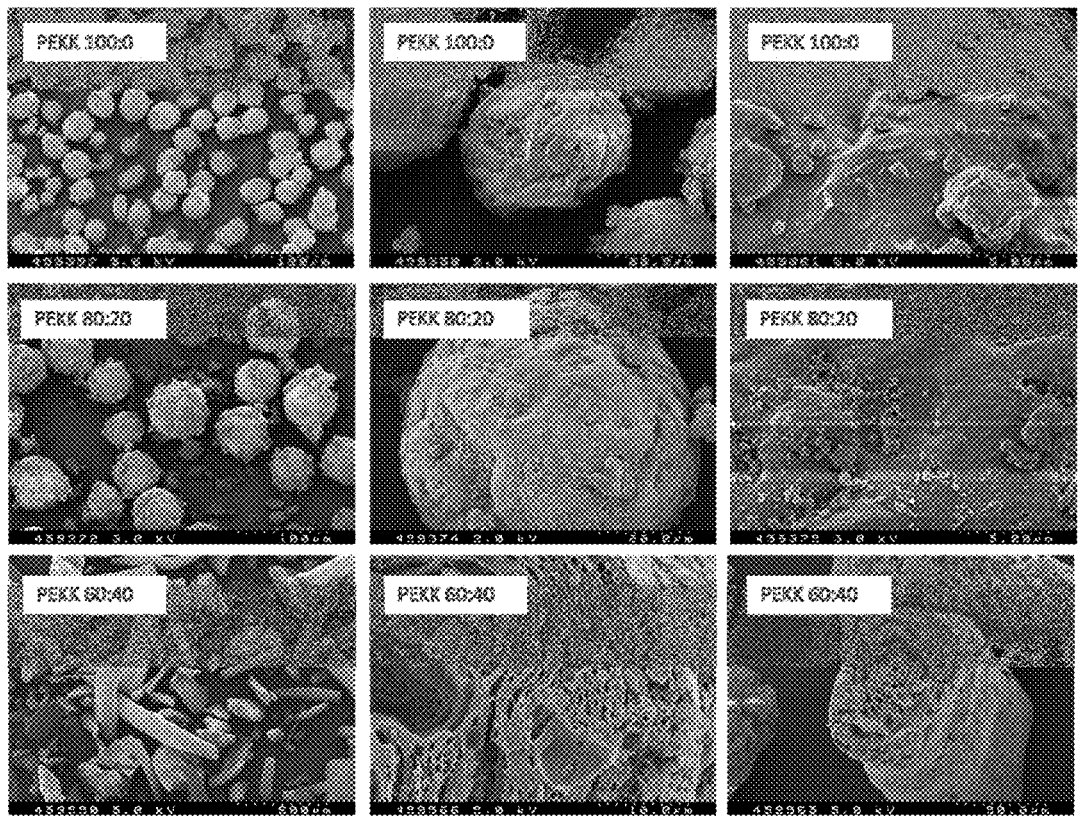
FIG. 1 shows the produced functionalized PEKK particles with different tere:iso (T:I) ratios, produced according to Examples 1 (100:0), 2 (80:20) and 4 (60:40).
Figure 2:
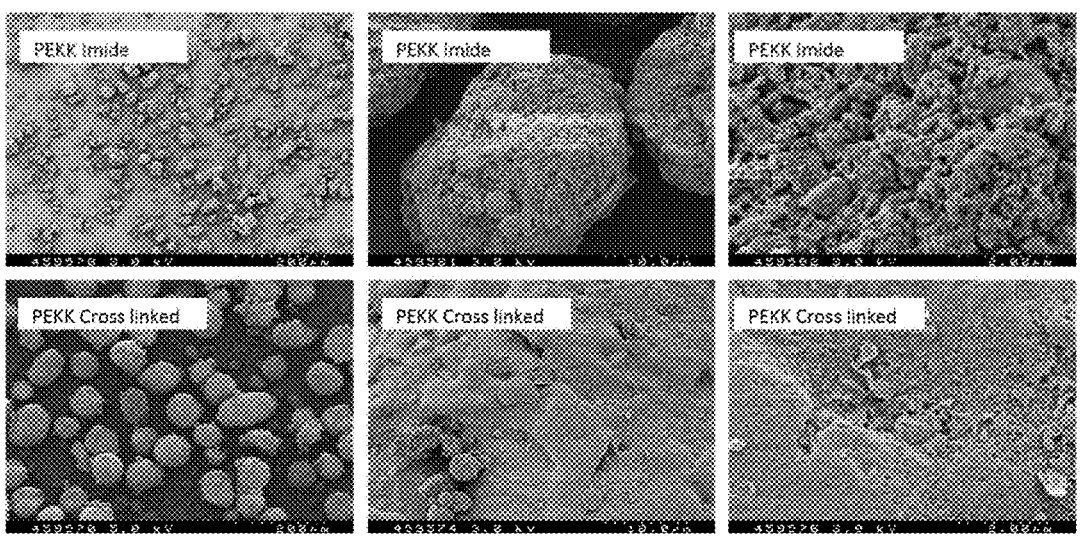
FIG. 2 shows co-polymer backbone PEKK imide and cross-linked versions produced according to Examples 9 and 5 at different magnifications showing size, shape, and surface features
Figure 3:
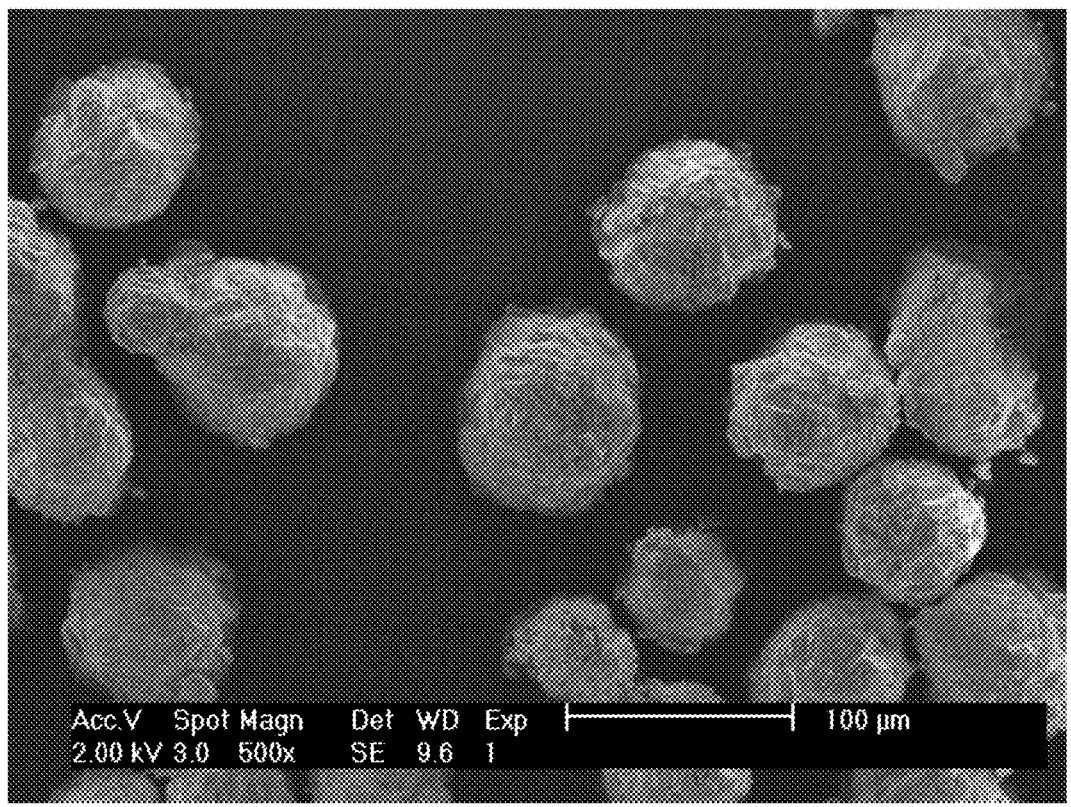
FIGS. 3 and 4 are scanning electron micrograph (SEM) images of amine reactive end cap PEKK polymer particles produced according to Example 2 with T:I ratio of 80:20 at 500× and 2000× magnification, respectively. These images show spherical particles that are on average 50-60 μm in diameter with some agglomeration of the particles as shown in FIG. 3. The surface features of the spherical particle as shown in FIG. 4 have characteristics similar to a "raisin" that the crevices and ridges were formed possibly due to contraction of the particle upon precipitating from solution.
Figure 4:
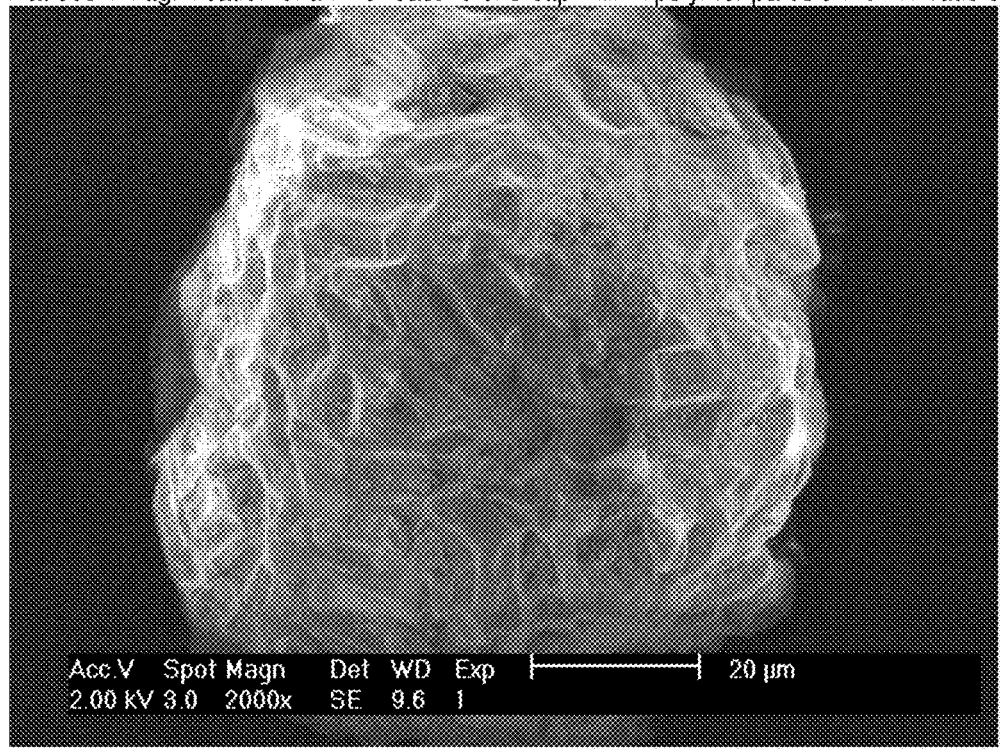

Table 1 shows the key information for the unfunctionalised (i.e. without amine end caps, prepared according to the method of WO 2011/004164) and amine end cap functionalized PEKK particles obtained according to the present invention. The inherent viscosities of both polymers were similar indicating similar molecular weights. The functionalized PEKK particle used the trifluoroacetyl protection route which was removed by treating the particles with a strong base to remove the trifluoroacetyl protecting group to obtain the reactive amine end group.

TABLE 1

| Particle ID | Inherent Viscosity (dl/g) | Capping agent |
|---|---|---|
| Unfunctionalised | 0.31 | None |
| Functionalized | 0.28 | $CF_3$-EC |

Example 1: Method for the Production of all 1,4-(100:0) PEKK with Terminal $NH_2$ Functionality, 5% Out of Balance The reaction vessel was a glass, round bottomed, jacketed five liter reaction vessel with a bottom outlet and four baffles. Dichloromethane (2500 ml) was placed in the reaction vessel which was fitted with an overhead stirrer with an anchor head plus two intermediate paddles set at 90°, a solids inlet, a nitrogen inlet and a thermocouple. The temperature of the vessel was controlled by a Julabo external cooler/heater unit and was logged using Julabo EasyTemp software.

The vessel was purged with nitrogen and the dichloromethane cooled to −20° C. with stirring at 200 rpm, this stirring rate was used throughout the addition of all the reactants. The nitrogen purge was removed during the solid additions but reconnected during longer cooling periods. Aluminium chloride ($AlCl_3$) (764.8 g, 5.74M) was added to the cooled dichloromethane resulting in a small temperature increase. On cooling back to −20° C., benzoic acid (292.96 g; 2.399M) was added slowly to the $AlCl_3$ slurry such as to maintain the temperature of the slurry bellow −10° C. The dichloromethane slurry developed a yellow colour due to the aluminium chloride; the majority of it remained at the bottom of the vessel. The reaction mixture was then allowed to cool back to −20° C.

Maintaining the reaction mixture below −5° C. 1,4-bis(4-phenoxybenzoyl)benzene (EKKE) 265.99 g; 0.5653M) was carefully added in portions. At this point the mixture turned bright opaque orange. The remaining monomer was transferred by washing with approximately 4×50 ml (200 ml) portions of dichloromethane. Terephthaloyl chloride (TPC) (120.81 g; 0.5951 M) was carefully added at a rate so as not to allow the mixture to rise above −10° C. The terephthaloyl chloride residues were transferred into the vessel by washing with approximately 200 ml dichloromethane in three portions.

Lastly the end-capper ("$CF_3$-EC"), 2,2,2-Trifluoro-N-(4-phenoxyphenyl) acetamide (16.69 g, 0.0596M) obtainable from Chem Bridge Corporation, San Diego, USA and purified prior to use was added with its washings, together with the remaining 100 ml of dichloromethane. The stirrer speed was increased to 500 rpm and maintained over the reaction time. The reaction mixture was slowly warmed to 5° C. then after 10 minutes to 20° C., where it was kept constant throughout the reaction time. After approximately 30 minutes all of the solids had dissolved forming an orange-red solution. After this point, dispersed polymer particles began to form. The reaction mixture was stirred rapidly for five hours. Sometimes it is necessary to add an additional 500 ml of dichloromethane to replace material that evaporates during the reaction. If the reaction is carried out in a pressurised vessel this will not be necessary. During this phase the nitrogen purge was replaced with a trap to collect and neutralise the hydrogen chloride evolved during the reaction.

The reaction mixture was removed from the vessel via the bottom outlet.

The reaction mixture is removed from the reaction vessel and isolated by vacuum filtration through a sinter. The orange solid was transferred to and decomplexed in approximately three liters of iced deionised water with stirring to produce a white particulate product. During decomplexing, the mixture should not reach greater than 5° C. The filtrate is also poured into iced water for decomplexing and disposal. The polymer remains in deionised water until workup. Prior to workup, the polymer particles should be entirely white, with no orange residues.

Workup procedures are typically carried out using a stirrer hotplate. Constant stirring is achieved with a large magnetic stirrer bar. A representative workup procedure for a PEKK polymerisation carried out in a one liter reactor is as follows:

Stand/stir in deionised water overnight at room temperature.
Filtered and slowly added to 1.5 liters of stirred, hot deionised water to remove the residual dichloromethane
100 ml concentrated hydrochloric acid added, boiled for 1 hour, filtered, washed with 500 ml deionised water, filtered
Slurry in 2 liters of deionised water, boiled for 1 hour, filtered, washed with 500 ml deionised water, filtered
Repeat the above.
Slurry in 2 liters of deionised water made to pH13 with ammonia solution (~30 ml), boiled for 1 hour, filtered, washed with 500 ml deionised water, filtered
Slurry in 2 liters deionised water, boiled for 1 hour, filtered, washed with 500 ml deionised water, filtered
Pale cream PEKK powder isolated During this process the trifluoroactetyl protecting groups are removed from the end-capper leaving free terminal amine functionality.

The powder was first dried at 120° C. overnight, or until dry, in an air oven. The powder was then re-dried at 200° C. overnight in a vacuum oven where the oven was continuously evacuated.

Dry yield ~270 g: 80% yield. The process produces a reasonable quantity of very fine particles and much of this is lost during the filtration steps.

Figure 5:
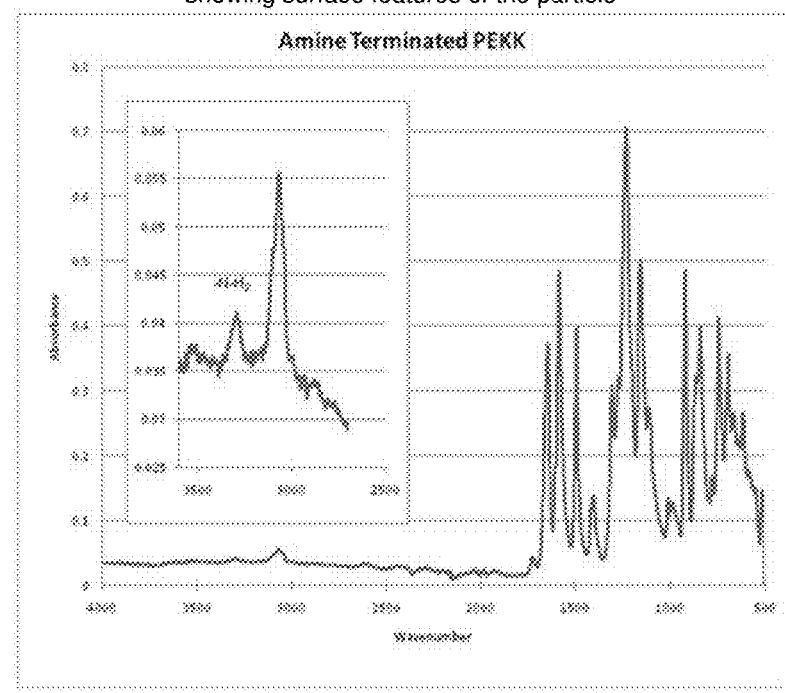
FIG. 5 shows an Infra-Red spectrum of the polymer of Example 1, showing —$NH_2$ groups.

The IV of the resultant polymer was 0.85 dl/g. $T_g$ 182° C.; $T_m$ 396° C. The presence of the primary amine group was confirmed by using the Nihydrin test and the Infra-Red spectrum of FIG. 5.

Example 1A: Comparison of IV Values for Functionalised and Unfunctionalised Polymers As in Table 1 above, the IV value for the polymer of Example 1 (0.85 dl/g) was found to be comparable to that found for an unfunctionalised (i.e. non-amine terminated) analogue, the latter being capped using a benzoyl group and having an IV value of 0.91 dl/g. The unfunctionalised polymer was prepared according to a method similar to that of Example 2 of WO 2011/004164 (this method being 3.5% out of balance whereas Example 2 of WO 2011/004164 was 2.24% out of balance).

The reagents used to produce the unfunctionalised PEKK were:
1,4-bis(4-phenoxybenzoyl)benzene—0.1063M-50 g
terephthaloyl chloride—0.08204M-16.655 g
isophthaloyl chloride—0.02051 M-4.163 g
Benzoic acid—0.41 M-50 g
Aluminium trichloride—1.002M-133.64 g
Benzoyl chloride—0.003754M-0.5277 g
Dichloromethane 450 ml To a 700 ml reaction flask equipped with a mechanical stirrer, having been purged with dry nitrogen, was added the 1,4-bis(4-phenoxybenzoyl)benzene along with 300 ml of dichloromethane. Having cooled the slurry to −20° C., the anhydrous aluminium trichloride was slowly added so as not to raise the temperature of the slurry above −10° C. and to minimise any splashing up the walls of the reactor. After cooling back to −20° C., a mixture of isophthaloyl chloride and terephthaloyl chloride was added to the slurry along with a further 100 ml of dichloromethane. Also at −20° C., the benzoic acid was added, followed by the benzoyl chloride as a capping agent.

Whilst stirring at 100 rpm the reaction mass was allowed to warm towards room temperature without additional heating. During this period, the colour of the reaction mass changed from yellow to pale orange. As the mass showed signs of phase separating, the speed of the stirrer was raised to 350 rpm and this speed was maintained for the duration of the synthesis. During the polymerisation, hydrogen chloride was evolved which was trapped and disposed of safely.

After stirring at room temperature for 6 hours the reaction mass was poured into 5 liters of iced water (care must be taken to avoid the temperature of the decomplexing mixture rising above room temperature). The aqueous mass was then stirred at room temperature for 4 hours or until all of the orange colouration had disappeared leaving a snow white mass.

Having transferred the white mass to a suitable vessel, the vessel was heated and the dichloromethane distilled off. Having removed all of the dichloromethane, the mass was brought to reflux and refluxed for 1 hour whereupon the suspension was filtered whilst hot. While the filtrate was left to cool the white polymer solid was added to a further 3 liters of deionised water and brought to reflux. This was repeated a further two times and in each case the filtrate was added to the initial filtrate and allowed to cool. The polymer powder was then dried overnight at 150° C. under a partial vacuum. On cooling, benzoic acid crystallised from the combined filtrates. The yield of benzoic acid was enhanced by chilling the filtrates to 5° C.

Example 2: Method for the Production of 1,4:1,3—(80:20) PEKK with Terminal $NH_2$ Functionality, 5% Out of Balance This was carried out in exactly the same manner as example 1 but where the quantities of terephthaloyl (TPC) and Isophthaloyl (IPC) chlorides were 73.69 g, 0.3630M and 47.12 g 0.2321M respectively.

The IV of the resultant polymer was 0.81 dl/g. $T_g$ 165° C.; $T_m$ 355° C.

Example 3: Method for the Production of 1,4; 1,3-(70:30) PEKK with Terminal $NH_2$ Functionality, 5% Out of Balance This was carried out in exactly the same manner as example 1 but where the quantities of TPC and IPC chlorides were 50.13 g, 0.2470M and 70.68 g 0.3481M respectively.

IV of the resultant polymer was 0.79 dl/g. $T_g$ 160° C., $T_m$ 338° C.

Example 4: Method for the Production of 1,4; 1,3—(60:40) PEKK with Terminal $NH_2$ Functionality 5% Out of Balance This was carried out in exactly the same manner as example 1 but where the quantities of TPC and IPC chlorides were 26.58 g, 0.1309M and 94.23 g 0.4642M respectively.

The IV of the resultant polymer was 0.83 dl/g. $T_g$ 158° C.

Example 5: Method for the Production of 1,4; 1,3—(80:20) PEKK with Terminal $NH_2$ Functionality 5% Crosslinked, 5% Out of Balance This was carried out using the procedure in example 1 using the following reagents:

| | |
|---|---|
| EKKE | 267.88 g (0.5693M) |
| TPC | 68.39 g (0.3369M) |
| IPC | 45.67 g (0.2249M) |
| 1,3,5 Benzenetricarbonyl chloride | 5.25 g (0.025M) |
| Benzoic acid | 289.16 g (2.37M) |
| Aluminium trichloride | 750.43 g (5.63M) |
| $CF_3$-EC | 16.84 g (0.0599M) |

Note: This is on the basis of end group concentration.

Total acid chloride end group conc. is $(0.3369+0.2249) \times 2 + 0.025 \times 3 = 1.1986$ 5% Out of balance is $0.95 \times 1.1986 = 1.1387$ or 0.5693M of EKKE=267.88 g Required $CF_3$-EC is $1.1986 - 1.1387 = 0.0599M = 16.85$ g The IV of the resultant polymer was 1.5 dl/g. $T_g$ 166° C.; $T_m$ 352° C.

Example 6: Method for the Production of a PEKK-Imide (70:30), all Terephthaloyl with Terminal $NH_2$ Functionality 5% Out of Balance This was carried out using the procedure in example 1 where some of the EKKE is replaced by the bis-imide monomer 5,5'-Oxybis(2-(4-phenoxyphenyl)isoindoline-1,3-dione) "EIEIE".

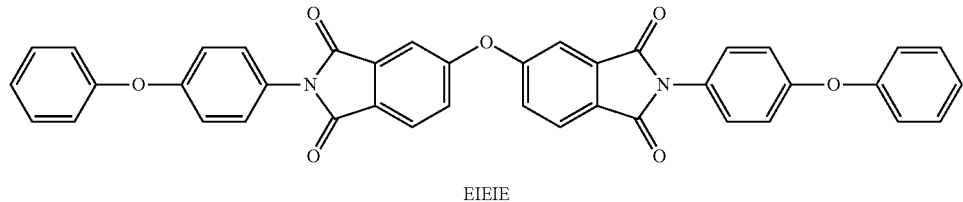 [SMILES: O=C1c2ccc(Oc3ccc4c(c3)C(=O)N(c3ccc(Oc5ccccc5)cc3)C4=O)cc2C(=O)N1c1ccc(Oc2ccccc2)cc1]

EIEIE

| | |
|---|---|
| EKKE | 139.64 g, (0.2968) |
| EIEIE | 81.99 g, (0.1272M) |
| TPC | 90.62 g, (0.4463M) |
| Benzoic acid | 218 g, (1.785M) |
| Aluminium trichloride | 612.38 g, (4.593M) |
| $CF_3$-EC | 12.54 g, (0.0446M) |

The IV of the resultant polymer was 0.78 dl/g. $T_g$ 178° C.; $T_m$ 342° C.

Example 7: Method for the Production of $NH_2$ End-Capped 80:20 PEKK; 5% Out of Balance The reaction vessel was a glass, round bottomed, jacketed two liter reaction vessel. Dichloromethane was placed in the reaction vessel fitted with an overhead stirrer with an anchor head, a solids inlet, a nitrogen inlet and a thermometer.

Dichloromethane (500 mL) was added to the vessel which was purged with dry nitrogen cooled to −20° C. with stirring at 200 rpm. The mixture in the reaction vessel was stirred constantly at a rate of approximately 200 rpm during the following additions. The nitrogen purge was removed during the additions but reconnected during longer cooling periods. Aluminium chloride (80.56 g, 0.6042M) was added, followed by dimethyl sulphone (15.25 g, 0.162M), not allowing the mixture to rise above −10° C. due to the exotherms. The dichloromethane developed a yellow colour due to the aluminium chloride, the majority of it remained at the bottom of the vessel. The reaction mixture was then allowed to cool back to −20° C.

A mixture of terephthaloyl chloride (9.6657 g; 0.0476M) and isophthaloyl chloride (6.7305 g; 0.03315M) was carefully added at a rate so as not to allow the mixture to rise above −10° C. The remaining acid chlorides were transferred by washing with approximately 50 ml dichloromethane in three portions. 1,4-Bis(4-phenoxybenzoylbenzene) (40 g; 0.085M) was carefully added at a rate so as not to allow the mixture to rise above −5° C. At this point the mixture turned bright opaque orange. The remaining monomer was transferred by washing with approximately 50 ml dichloromethane in three portions.

Lastly, ($CF_3$-EC) 2,2,2-trifluoro-N-(4-phenoxyphenyl)acetamide (2.3849 g; 0.00848M) was added with its washings (50 ml) of dichloromethane. The stirrer speed was maintained at 200 rpm and maintained over the reaction time. The reaction mixture was slowly warmed to 5° C. then after 10 minutes to 20° C., where it was kept constant throughout the reaction time. Upon warming, the nitrogen purge was removed and evolved hydrogen chloride captured using an aqueous solution of sodium bicarbonate. After approximately 30 minutes all of the solids had dissolved forming an orange-red solution. After this point the reaction mixture phase separated and eventually formed a gel. After full gellation the stirrer was stopped and the mixture maintained at +20° C. for between 4 and 5 hours. At the end of the reaction time the gel was removed from the vessel. The polymer complex was decomplexed in iced water using a 4 L Waring blender giving a snow white solid. When fully decomplexed the polymer was filtered off and washed with 1.5 L of deionised water. The polymer fluff was re-slurried in 2 L of deionised water and left stirring overnight under a flow of filtered air to remove most of the dichloromethane.

Prior to workup, the polymer particles should be entirely white, with no orange parts remaining.

Work up procedure:

Stand in deionised water overnight

Filtered and slowly added to 1.5 liters of stirred, hot deionised water to remove the residual dichloromethane 100 ml concentrated hydrochloric acid added, boiled for 1 hour, filtered, washed with 500 ml deionised water, filtered 1.5 liters of deionised water, boiled for 1 hour, filtered, washed with 500 ml deionised water, filtered 1.5 liters deionised water, boiled for 1 hour, filtered, washed with 500 ml deionised water, filtered 1.5 liters deionised water made to pH 13 with ammonia solution (~30 ml), boiled for 1 hour, filtered, washed with 500 ml deionised water, filtered 1.5 liters deionised water, boiled for 1 hour, filtered, washed with 500 ml deionised water, filtered Off-white PEKK powder isolated The polymer was dried overnight under vacuum at 125° C. followed by further drying at 200° C. under vacuum also overnight.

The resulting polymer had an IV of 0.6 dl/g. The polymer structure and the presence of free (unprotected) secondary amine groups were confirmed by $^1$H, $^{13}$C NMR and FT-IR spectroscopy. The secondary amine groups were also indicated using ninhydrin. DSC studies showed the polymer to have a $T_g$ at 160° C. and $T_m$ between 355-362° C.

Other examples at 3%, 4% and 7% out of balance were similarly prepared and characterised, together with examples where the terephthaloyl to isophthaloyl ratios were 100:0, 90:10, 70:30 and 60:40.

Similar results were obtained using N-acetyl-4-phenoxyaniline in place of 2,2,2-trifluoro-N-(4-phenoxyphenyl)acetamide (CF$_3$-EC). However the work-up times needed to be extended to ensure complete removal of the less reactive protecting group.

Example 8—Synthesis of Amine Terminated 70:30 PEKK

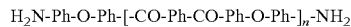

A 2 L jacketed reaction vessel fitted with an efficient stirrer, thermometer, nitrogen inlet and gas outlet, containing 1 L of anhydrous dichloromethane was cooled to −20° C. under a nitrogen purge. To the cold stirred dichloromethane was added 113.6 gg (0.852 moles) of anhydrous aluminium trichloride. During this addition the temperature of the dichloromethane rose to −12° C. After re-cooling to −15° C., 20.19 g (0.2145 moles) of dimethyl sulphone was slowly added to the slurry keeping the temperature of the slurry below −5° C. At −10° C., 9.65 g (0.0475 moles) of Isophthaloyl chloride and 6.0779 g (0.0299 moles) of terephthaloyl chloride were added to the reaction mixture. Care was taken to ensure that both acid chloride residues were from the beakers and that caught on the addition funnel were completely washed into the reaction vessel using 100 cc of fresh dichloromethane. The temperature rise during this addition was minimal. Again at −15° C., 38.3686 g (0.0816 moles) of 1,4-bis(4-phenoxybenzoyl)benzene (EKKE) was slowly added to the slurry while maintaining the reaction temperature below −10° C. Residual EKKE was carefully washed into the reaction vessel using 100 cc of fresh dichloromethane. After connecting the reaction vessel to an acid gas scrubber, the temperature of the reaction mixture was increased to +20° C. over 45 minutes. Finally the protected end-capper N-acetyl-4-phenoxyaniline 1.9316 g (0.00851 moles) was added to the reaction mixture and any residues washed into the reaction vessel with 50 cc of fresh dichloromethane. During this time all of the reaction solids dissolved to give a clear orange solution and hydrogen chloride was seen to be evolved. The temperature of the reaction vessel was maintained at +20° C. for 6 hours. During the first 1.5 hours the viscosity of the orange solution increased until a gel was formed stopping the stirrer. At this point the stirrer was switched off.

The polymer complex was decomplexed by blending the orange rubbery mass in a Waring blender in the presence of ice and water, the blending mixture being kept below +20° C. During this process the polymer turned from orange to show white. The white polymer fluff was filtered and washed on the filter with 2×1 L of deionised water. After removing the majority of the water by vacuum filtration, the polymer was slurried overnight in 4 L of deionised water at room temperature. After filtering, the fluff was slowly added to 3 L of hot (70° C.) deionised water in portions to minimise foaming as the dichloromethane was removed. To the hot slurry was then added 150 mL of concentrated hydrochloric acid and the slurry refluxed for 3 hours to ensure complete removal of the dichloromethane and removal of the protecting group. The fluff was then filtered again and the fluff washed on the filter with 2×2 L of deionised water. This process was then repeated. After the repeat the fluff was further refluxed for 1 hour in 4 L of deionised water containing 100 mL of 0.88 ammonia. After filtering and washing with 2×2 L of deionised water the fluff was finally again refluxed in 4 L of deionised water, filtered and washed.

The polymer fluff was dried overnight (16 hours) at 100° C. followed by a further drying at 200° C. for 8 hours under vacuum.

Optionally the polymer can be end capped using trifluoroacetyl protected end-capper CF$_3$-EC (2,2,2-trifluoro-N-(4-phenoxyphenyl)acetamide) in place of N-acetyl-4-phenoxyaniline (CH$_3$—CO—NH-Ph-O-Ph).

The IV of the polymer was 0.85 dl/g measure as a 0.1% solution in concentrated sulphuric acid. $T_g$ 164° C., $T_m$ 338° C.

Example 9—Method for the Production of NH$_2$ End Capped 100:0 PEKK-EIEIEKK 10% Random Copolymer The reaction vessel was a glass, round bottomed, jacketed five liter reaction vessel with a bottom outlet and four baffles. Dichloromethane (DCM) was placed in the reaction vessel fitted with an overhead stirrer with an anchor head and additional agitation vanes up the length of the stirrer shaft, a solids inlet, a nitrogen inlet and a thermocouple. The temperature of the vessel was controlled by a Julabo external cooler/heater unit and was logged using Julabo EasyTemp software.

The vessel was purged with nitrogen and the dichloromethane (DCM) allowed to cool to −20° C. with stirring at 200 rpm. The mixture in the reaction vessel was stirred constantly at a medium rate of approximately 200 rpm during the following additions. The nitrogen purge was removed during the additions but reconnected during longer cooling periods. Aluminium chloride (609.64 g. 4.572M)) was added, followed by benzoic acid (218.24 g, 1.787M)), not allowing the mixture to rise above −10° C. due to the exotherms. The dichloromethane (DCM) developed a yellow colour due to the aluminium chloride, the majority of it remained at the bottom of the vessel. The reaction mixture was then allowed to cool back to −20° C.

Terephthaloyl chloride (90.60 g) was carefully added at a rate so as not to allow the mixture to rise above −10° C. The remaining acid chloride was transferred by washing with approximately 100 ml dichloromethane (DCM) in three portions. (EIEIE) (82.20 g) was carefully added at a rate so as not to allow the mixture to rise above −10° C., causing the mixture to turn bright opaque orange. The remaining monomer was transferred by washing with approximately 50 ml dichloromethane (DCM) in three portions. EKKE (1,4-bis (4-phenoxybenzoylbenzene) (140.00 g, 0.2975M) was carefully added at a rate so as not to allow the mixture to rise above −5° C. The remaining monomer was transferred by washing with approximately 50 ml dichloromethane (DCM) in three portions.

Lastly, CF$_3$-EC (2,2,2-Trifluoro-N-(4-phenoxyphenyl) acetamide)(11.96 g, 0.0426M)) was added with its washings, together with the remaining dichloromethane (DCM). The stirrer speed was increased to 500 rpm and maintained over the reaction time. The nitrogen purge was removed and replaced with a water pump fitted with an air vent so as not to place the reaction system under vacuum. This was to trap and remove the hydrogen chloride evolved from the polymerisation. The reaction mixture was slowly warmed to 5° C. then after 10 minutes to 20° C., where it was kept constant throughout the reaction time. After approximately 30 minutes all of the solids had dissolved forming an orange-red solution. After this point, dispersed polymer particles began to form. The reaction mixture was stirred rapidly for five hours. The reaction mixture was removed from the vessel via the bottom outlet.

The reaction mixture is removed from the reaction vessel and isolated by vacuum filtration through a sinter. The orange solid is decomplexed in approximately three liters of iced deionised water with stirring to produce a white particulate product. During decomplexation, the mixture should not reach greater than 5° C. The filtrate is also poured into iced water for decomplexation and disposal. The polymer remains in deionised water until workup. Prior to workup, the polymer particles should be entirely white, with no orange parts remaining.

A representative workup procedure for a PEKK polymerisation carried out in a one liter reactor is as follows:
Stand in deionised water overnight
Filtered and slowly added to 1.5 liters of stirred, hot deionised water to remove the residual dichloromethane (DCM)
Made up to 5 L with hot deionised water, 100 ml concentrated hydrochloric acid added, boiled for 1 hour, filtered, washed with 1 L deionised water, filtered
5 liters deionised water made to pH 13 with sodium hydroxide pellets, boiled for 1 hour, filtered, washed with 1 L deionised water, filtered
5 liters of deionised water, boiled for 1 hour, filtered, washed with 1 L deionised water, filtered
5 liters of deionised water, boiled for 1 hour, filtered, washed with 1 L deionised water, filtered
5 liters of deionised water, boiled for 1 hour, filtered, washed with 1 L deionised water, filtered
Off-white PEKK powder isolated
The IV of the resultant polymer was 0.75 dl/g.

Example 10—Preparation of Capping Agent—N-(4-Phenoxyphenyl)Acetamide

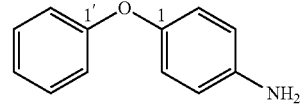

4-Phenoxyaniline (20.4 g, 0.110 mol) was dissolved in glacial acetic acid (200 ml) with stirring. To the very dark brown solution was added decolourising charcoal (3 g) and the resulting suspension stirred for 15 minutes. The suspension was filtered through a Soxhlet thimble into a conical flask. On drainage of the thimble, further glacial acetic acid (200 ml) was filtered into the conical flask via the thimble. After cooling the conical flask in an ice bath to 5° C., acetic anhydride (11.1 cm³, 0.109 mol) was added to the aniline solution. An exothermic reaction occurred, raising the temperature to 30° C. After stirring for 30 minutes the solution was poured into water (1000 ml) and stirred for 10 minutes. After collecting the product by filtration the crude product was dried in an air over overnight at 80° C. The crude product was purified by crystallisation from hot methylcyclohexane (300 ml) and decolorised using activated charcoal. The pale pink product was collected by filtration, washed with 50 ml of methanol and dried under vacuum at 80° C. overnight. The product N-(4-phenoxyphenyl)acetamide was isolated as a pink crystalline solid (21.0 g, 85%); purity 99.99 mol % (DSC), m.p. 131.2° C. {lit. 130-131° C.}. Structure confirmed by FT-IR, $^1$H NMR, $^{13}$C NMR and mass spectrometry.

Example 11—4-Phenoxyaniline by the Hydrolysis of CF$_3$-EC,
2,2,2-Trifluoro-N-(4-Phenoxyphenyl)Acetamide

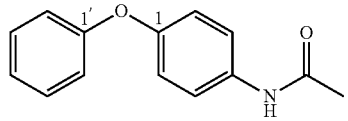 [SMILES: CC(=O)Nc1ccc(Oc2ccccc2)cc1]

A portion of CF$_3$-EC (2,2,2-trifluoro-N-(4-phenoxyphenyl)acetamide), purified prior to use, (100 mg, 0.36 mmol), was placed in a beaker with deionised water (25 ml) and IPA (25 ml), and made up to pH 13 with a single sodium hydroxide pellet, which caused CF$_3$-EC (2,2,2-trifluoro-N-(4-phenoxyphenyl)acetamide) to dissolve. The mixture was heated at 85° C. for 1.5 hours, during which time a white suspension was produced. The solid was isolated by filtration and, washed with deionised water and dried in an air oven to yield 4-phenoxyaniline as a white crystalline solid (47 mg, 71%), mp 85.1° C. {lit. 85-86° C.}; purity 99.95 mol % (DSC).

Structure confirmed by FT-IR, $^1$H NMR, $^{13}$C NMR and mass spectrometry.

Model Compounds—Linear

Example 12—Synthesis of Model Compound 3

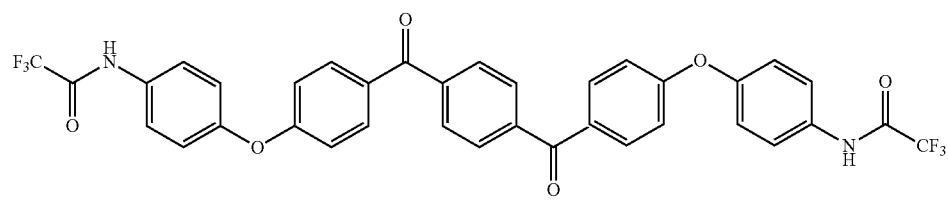

(3)

DCM (50 ml) was added to a conical flask with a magnetic stirrer, and cooled in ice to 5° C. Aluminium chloride (5.03 g, 37.7 mmol) was added, with stirring, together with the DCM washings. Between each of the subsequent additions and washings, the mixture was cooled in ice to below room temperature with stirring. Next, CF$_3$-EC (2,2,2-trifluoro-N-(4-phenoxyphenyl) acetamide) (4.17 g, 14.8 mmol) was added, followed by TPC (1.51 g, 7.44 mmol), including the DCM washings (100 ml total). The mixture was stirred at room temperature for 1.5 hours, during which time the orange-brown solution became yellow. The reaction mixture was poured into stirring iced water, yielding a white precipitate in the DCM layer. This mixture was heated on a hotplate to remove the DCM. The cream precipitate 3 was isolated by filtration, was washed with deionised water (3×50 ml) and dried in an air oven. The cream product was recrystallised in dimethylacetamide, washed with acetone and dried in an air oven, yielding 5 as a grey solid (4.72 g, 92%); mp 325.0° C.; purity 98.85 mol % (DSC); Structure confirmed by FT-IR, $^1$H NMR, $^{13}$C NMR and mass spectrometry.

Example 13—Synthesis of Model Compound 4

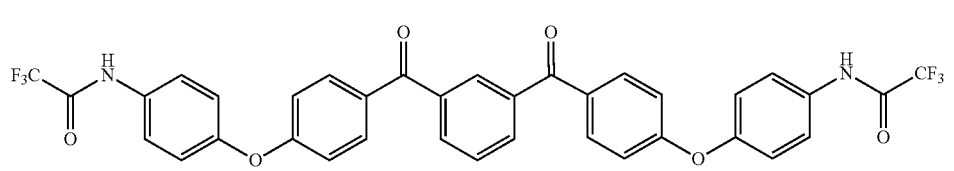

(4)

DCM (50 ml) was added to a conical flask with a magnetic stirrer and cooled in ice to 5° C. Aluminium chloride (4.84 g, 36.3 mmol) was added, with stirring, together with the DCM washings. Between each of the subsequent additions and washings, the mixture was cooled in ice to below room temperature with stirring. Next, CF$_3$-EC (2,2,2-Trifluoro-N-(4-phenoxyphenyl) acetamide)(4.16 g, 14.8 mmol) was added, followed by TPC (1.51 g, 7.44 mmol), including the DCM washings (100 ml total). The mixture was stirred at room temperature for 1.5 hours, during which time the orange-brown solution became bright orange. The reaction mixture was poured into stirring iced water, yielding a white precipitate in the DCM layer. This mixture was heated on a hotplate to remove the DCM. The cream precipitate 4 was isolated by filtration, was washed with deionised water (3×50 ml) and dried in an air oven. The cream product was recrystallised in dimethylacetamide, washed with acetone and dried in an air oven, yielding 4 as a grey solid (4.76 g, 92%); m.p. 231.0° C.; purity 97.42 mol % (DSC); Structure confirmed by FT-IR, $^1$H NMR, $^{13}$C NMR and mass spectrometry.

Example 14—Synthesis of Model Compound 5 by the Deprotection of 3

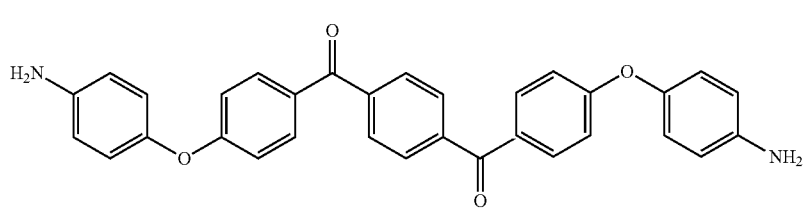

(5)

A portion of 3 (130 mg, 0.188 mmol), was placed in a beaker with deionised water (25 ml) and propan-2-ol (25 ml), and made up to pH 13 with a single sodium hydroxide pellet, which caused 3 to dissolve. The mixture was heated at 85° C. for 1.5 hours, during which time a cream suspension was produced. The solid was isolated by filtration, washed with deionised water and dried in an air oven to yield 5 as a beige crystalline solid (76 mg, 85%); mp 199.5° C., purity 97.63 mol % (DSC).

Structure confirmed by FT-IR, $^1$H NMR, $^{13}$C NMR and mass spectrometry.

Example 15—Synthesis of Model Compound 6 by the Deprotection of 4

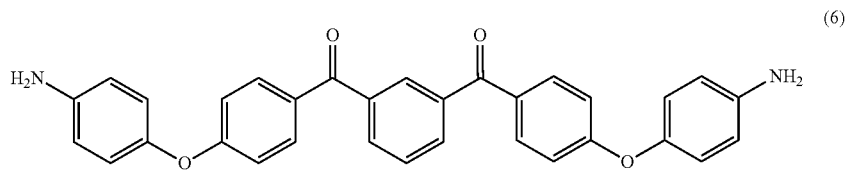 [SMILES: Nc1ccc(Oc2ccc(C(=O)c3cccc(C(=O)c4ccc(Oc5ccc(N)cc5)cc4)c3)cc2)cc1]

(6)

A portion of 4 (113 mg, 0.164 mmol), was placed in a beaker with deionised water (25 ml) and IPA (25 ml), and made up to pH 13 with a single sodium hydroxide pellet, which caused 4 to dissolve. The mixture was heated at 85° C. for 1.5 hours, during which time a white suspension was produced. The solid was isolated by filtration, washed with deionised water and dried in an air oven to yield 6 as a white crystalline solid (62 mg, 80%); m.p. 165.2° C.; purity 98.74 mol % (DSC).

Structure confirmed by FT-IR, $^1$H NMR, $^{13}$C NMR and mass spectrometry.

Model Compounds—Trifunctional

Example 16—Synthesis of Model Compound 1

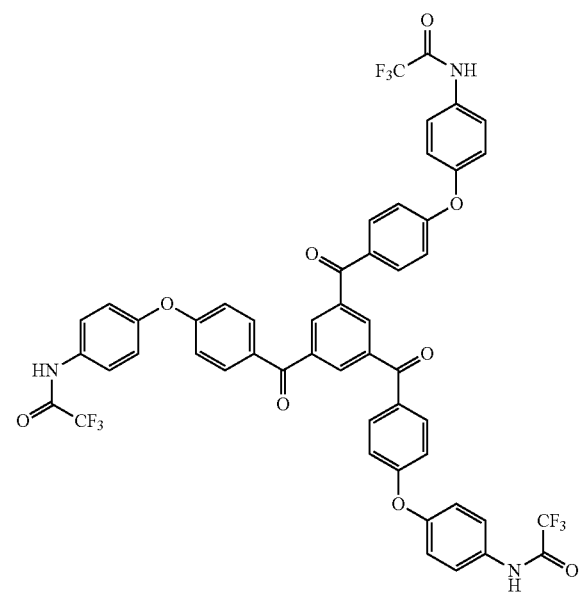

1

DCM (100 ml) was added to a conical flask with a magnetic stirrer and cooled in ice to 5° C. Aluminium chloride (5.11 g, 38.3 mmol) was added, with stirring, together with the DCM washings. Between each of the subsequent additions and washings, the mixture was cooled in ice to below room temperature with stirring. Next, 1,3,5-benzenetricarbonyl chloride (1.52 g, 5.73 mmol) was added, followed by 2,2,2-trifluoro-N-(4-phenoxyphenyl)acetamide (6.00 g, 21.3 mmol), including the DCM washings (100 ml total). The addition of 2,2,2-trifluoro-N-(4-phenoxyphenyl)acetamide caused the solution to turn green. The mixture was stirred at room temperature for 1.5 hours. After 5 minutes the solution became orange, then after a further 15 minutes a dark viscous liquid formed at the bottom of the flask. The resulting orange solution and dark orange viscous solid was poured into iced water, and was stirred at a moderate speed for 1 hour, resulting in a small amount of a white precipitate in the aqueous layer and an orange organic layer. This mixture was heated on a hotplate to remove the DCM. A green sticky solid was isolated by decanting the aqueous layer. This solid was dissolved in acetone (100 ml) and decolourising charcoal added (~1 g). After stirring for 10 minutes, the solution was filtered, yielding a pale brown solution. On evaporation of the acetone, a brown sticky solid remained. This solid was stirred in methanol (100 ml), causing the precipitation of a white solid. The solid was isolated by filtration and dried in an air oven, yielding 1 as a pale grey solid (0.78 g, 32%); m.p. 172.3° C.; purity 97.82 mol % (DSC).

Structure confirmed by FT-IR, $^1$H NMR, $^{13}$C NMR and mass spectrometry.

Example 17—Synthesis of Model Compound 2

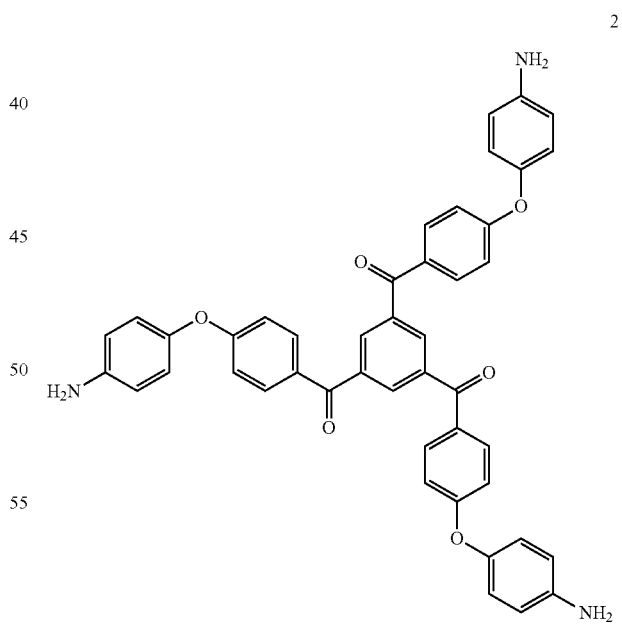

2

A portion of 1 (153 mg, 0.153 mmol), was placed in a beaker with deionised water (25 ml) and propan-2-ol (25 ml), and made up to pH 13 with a single sodium hydroxide pellet, which caused 1 to dissolve. The mixture was heated at 85° C. for 1.5 hours, during which time a yellow suspension was produced. The solid was isolated by filtration, washed with deionised water and dried in an air oven to yield 2 as a pale yellow solid (0.0771 g, 71%); mp 167.4° C., purity 97.72 mol % (DSC).

Structure confirmed by FT-IR, $^1$H NMR, $^{13}$C NMR and mass spectrometry. The protected amine had been deprotected.

Example 18—Sulphone Copolymer (Random)

As in example 1 where the reagents used were:
Reaction run 3% out of balance to give a random copolymer.

| | |
|---|---|
| 4,4'-diphenoxybenzophenone (EKE) | 22.7547 g (0.0621M) |
| 4,4'-diphenoxydiphenylsulphone (ESE) | 24.9934 g (0.0621M) |
| Terephthaloyl chloride (TPC) | 26 g (0.1281M) |
| CF$_3$-EC | 2.1936 g (7.8 × 10$^{-3}$M) |
| Dimethyl sulphone (Lewis base) | 23.17 g (0.2462M) |
| Aluminium trichloride (Lewis acid) | |
| Dichloromethane (DOM) | |

The polymer gel was decomplexed in ice/water using a Waring blender. The polymer fluff was worked up as in example 1.

IV of the resultant polymer was 1.13 dl/g. T$_g$ was 183° C., the polymer was amorphous.

Example 19—Suphone Copolymer (Block)

As in example 18 but the resultant polymer was a block co-polymer.

In this instance the ESE was first reacted with 9.4556 g (0.04657M) of TPC and after 1 hour at 20 C the remainder of the TPC plus the EKE was added followed by the CF$_3$-EC. The polymer gel was worked up as in example 18.

The IV of the resultant polymer was 1.08 dl/g. The T$_g$ of the product was 180° C. and the T$_m$ 362° C. The polymer was semi-crystalline.

What is claimed is:

1. A method of preparing an amine-functionalized polyaryletherketone polymer, an imide- or sulphone-copolymer thereof or an amine-protected analogues thereof,
    said method comprising:
    polymerizing a monomer system in a reaction medium comprising a Lewis acid, a controlling agent and a capping agent comprising —NR$_2$, —NRH or a protected amine group,
    wherein each R is independently an aliphatic group or an aromatic group.

2. The method of claim 1, wherein said controlling agent comprises an aromatic carboxylic acid, an aromatic sulphonic acid, or a derivative thereof.

3. The method of claim 1, wherein said controlling agent comprises a Lewis base.

4. The method of claim 1, wherein said monomer system comprises an imide and/or sulphone monomer.

5. The method of claim 1, wherein said capping agent is an agent represented by formula (Z)$_a$—Ar—(X)$_b$ wherein:
    each X is independently selected from the group consisting of —O—Ar, —C(=O)Cl, —C(=O)—Ar—O—Ar and —O—Ar—[—C(=O)—Ar—O—Ar—]$_c$—H,
        wherein each Ar is independently an aromatic group;
    c is an integer;
    Z is a protected amine group;
    a is 1 to 5; and
    b is 1 to 5.

6. The method of claim 1, wherein said controlling agent is one or more of
    (i) Ar'(COOX)$_y$;
    (ii) Ar'(SO$_3$X)$_y$;
    (iii) (Ar'COO$^-$)$_z$M$^{z+}$; or
    (iv) (Ar'SO$_3^-$)$_z$M$^{z+}$;
    wherein Ar' is an aromatic group compatible with the remaining components of the reaction medium;
    each X independently is a hydrogen atom or an organic group (R);
    each y independently is 1, 2 or 3;
    each M independently is a metal ion, and
    each z independently is an integer equal to charge on the metal ion (M$^{z+}$).

7. The method of claim 1, wherein said polyaryletherketone is a homopolymer or copolymer of one or more of the following repeat units:
    —Ar—O—Ar—C(=O)—
    —Ar—O—Ar—C(=O)—Ar—C(=O)—
    —Ar—O—Ar—O—Ar—C(=O)—
    —Ar—O—Ar—O—Ar—C(=O)—Ar—C(=O)—
    —Ar—O—Ar—C(=O)—Ar—O—Ar—C(=O)—Ar—C(=O)—
    wherein each Ar is independently an aromatic moiety.

8. The method of claim 7, wherein each Ar is independently selected from the group consisting of substituted and unsubstituted mononuclear aromatic moieties and substituted and unsubstituted polynuclear aromatic moieties.

9. The method of claim 7, wherein Ar is phenylene.

10. The method of claim 1, wherein said polyaryletherketone is a homopolymer.

11. The method of claim 1, wherein said polymer is PEKK or an imide or sulphone copolymer thereof.

12. The method of claim 1, wherein the Lewis acid is added to the reaction medium prior to the controlling agent.

13. The method of claim 12, wherein the components are added to the reaction medium in the following order:
    (i) the Lewis acid
    (ii) the controlling agent
    (iii) the monomers and the capping agent.

14. The method of claim 1, wherein the amine-functionalized polyaryletherketone polymer is an amine-terminated polyaryletherketone polymer.

15. The method of claim 5, wherein each Z is independently selected from the group consisting of —NHL, —NRL and —NL$_2$, each L is a leaving group independently selected from the group consisting of an acetyl, haloacetyl, sulphonyl, halosulphonyl, —SO$_2$—R, c is 1 to 10, each R is independently an aliphatic or aromatic group.

16. The method of claim 5, wherein a is 1, 2 or 3.

17. The method of claim 5, wherein b is 1, 2 or 3.

18. The method of claim 15, wherein Z is —NHL, L is trifluoroacetyl, —SO$_2$—CH$_3$ or —SO$_2$—CF$_3$, c is 1 to 4, a is 1, and b is 1.

19. The method of claim 7, wherein Ar is an unsubstituted phenylene.

20. A method of preparing an amine-functionalized polyaryletherketone polymer, an imide- or sulphone-copolymer thereof or an amine-protected analogues thereof,
    said method comprising:
    polymerizing a monomer system in a reaction medium comprising a Lewis acid and a capping agent represented by formula (Z)$_a$—Ar—(X)$_b$ wherein:
    each X is independently selected from the group consisting of —O—Ar, —C(=O)Cl, —C(=O)—Ar—

O—Ar and —O—Ar—[—C(=O)—Ar—O—Ar—]$_c$—H, wherein each Ar is independently an aromatic group;

c is an integer;

Z is a protected amine group;

a is 1 to 5; and b is 1 to 5.

21. The method of claim 20, wherein said reaction medium further comprises a controlling agent.

* * * * *